(12) United States Patent
Hiremath et al.

(10) Patent No.: US 12,225,649 B2
(45) Date of Patent: Feb. 11, 2025

(54) ELECTRICAL FIELD OF VIEW CONTROL FOR A PASSIVE LIGHT SENSOR

(71) Applicant: CREE LIGHTING USA LLC, Racine, WI (US)

(72) Inventors: Amruteshwar Hiremath, Cary, NC (US); Jin Hong Lim, Morrisville, NC (US); Kory A. Liszt, Apex, NC (US)

(73) Assignee: CREE LIGHTING USA LLC, Racine, WI (US)

( * ) Notice: Subject to any disclaimer, the term of this patent is extended or adjusted under 35 U.S.C. 154(b) by 299 days.

(21) Appl. No.: 17/706,244

(22) Filed: Mar. 28, 2022

(65) Prior Publication Data

US 2022/0217829 A1    Jul. 7, 2022

Related U.S. Application Data

(63) Continuation-in-part of application No. 16/857,690, filed on Apr. 24, 2020, now Pat. No. 11,287,325.

(51) Int. Cl.
| | | |
|---|---|---|
| *H05B 47/13* | (2020.01) | |
| *G01J 5/00* | (2022.01) | |
| *G01J 5/02* | (2022.01) | |

(52) U.S. Cl.
CPC .......... *H05B 47/13* (2020.01); *G01J 5/0022* (2013.01); *G01J 5/024* (2013.01)

(58) Field of Classification Search
CPC .. G01J 5/0025; G01J 5/026; G01J 5/10; G01J 5/04; G01V 8/10
See application file for complete search history.

(56) References Cited

U.S. PATENT DOCUMENTS

| | | |
|---|---|---|
| 9,894,740 B1 | 2/2018 | Liszt et al. |
| 10,234,121 B2 | 3/2019 | Wilcox et al. |
| 10,264,657 B2 | 4/2019 | Liszt et al. |
| 10,342,102 B2 * | 7/2019 | Bowser .................. H05B 47/19 |
| 10,405,406 B2 | 9/2019 | Liszt |
| 10,480,996 B2 | 11/2019 | Roberts |
| 11,287,325 B2 * | 3/2022 | Hiremath .................. G01J 5/10 |

OTHER PUBLICATIONS

Cree Lighting, "0-10V Zone Controller", Installation Instructions, pp. 1-3, obtained on Jan. 30, 2020, obtained from Internet: http://api.icentera.com/v2/gelfile.aspx?=9C5366AB5A7A42C0EC6D3142622934E0ED4018D3983647409F2258C8649755E537241349E24FC7686F9F4263BD8CBDF8.

* cited by examiner

*Primary Examiner* — David P Porta
*Assistant Examiner* — Meenakshi S Sahu
(74) *Attorney, Agent, or Firm* — J. Clinton Wimbish; Maynard Nexsen PC

(57) ABSTRACT

A motion sensing device adapts a field of view around a primary sensing axis of the motion sensing device by electrically controlling a detection sensitivity of a passive infrared sensor of the motion sensing device. Responsive to adapting the field of view, the motion sensing device monitors for motion within the field of view using the passive infrared sensor.

18 Claims, 29 Drawing Sheets

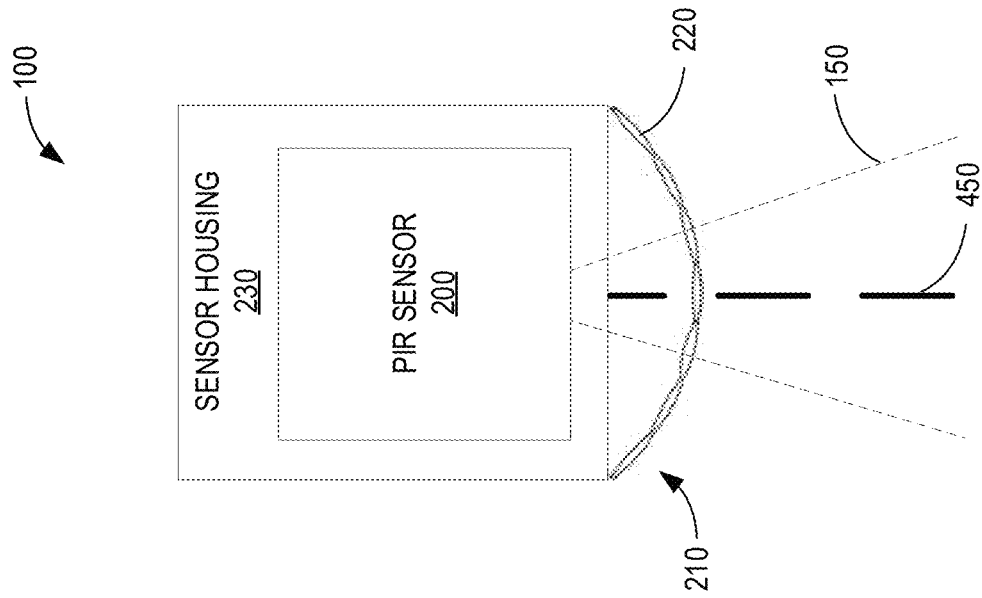
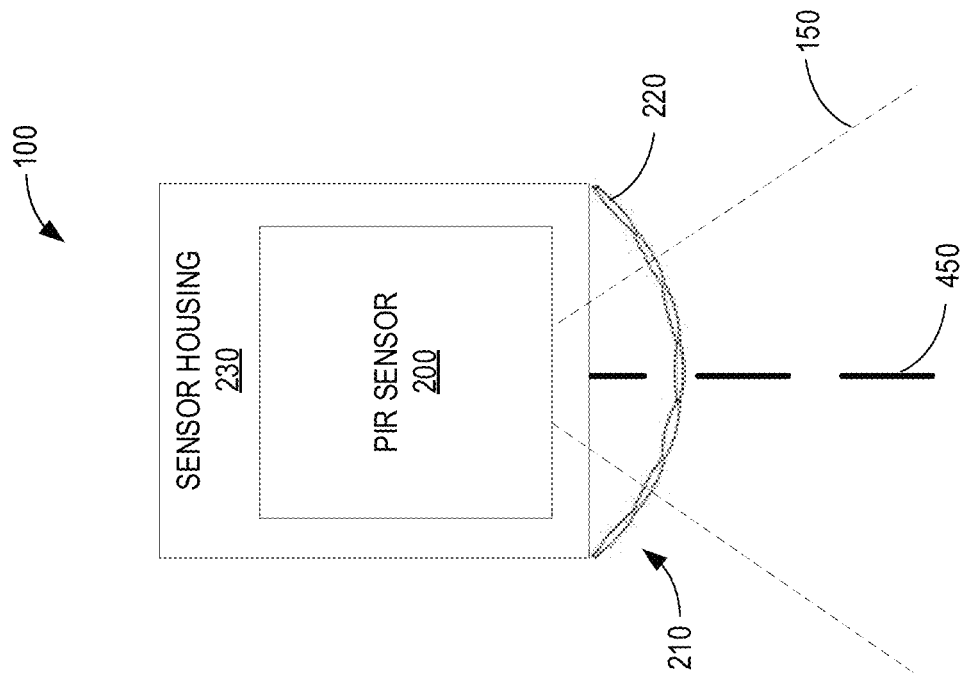
FIG. 2A
FIG. 2B

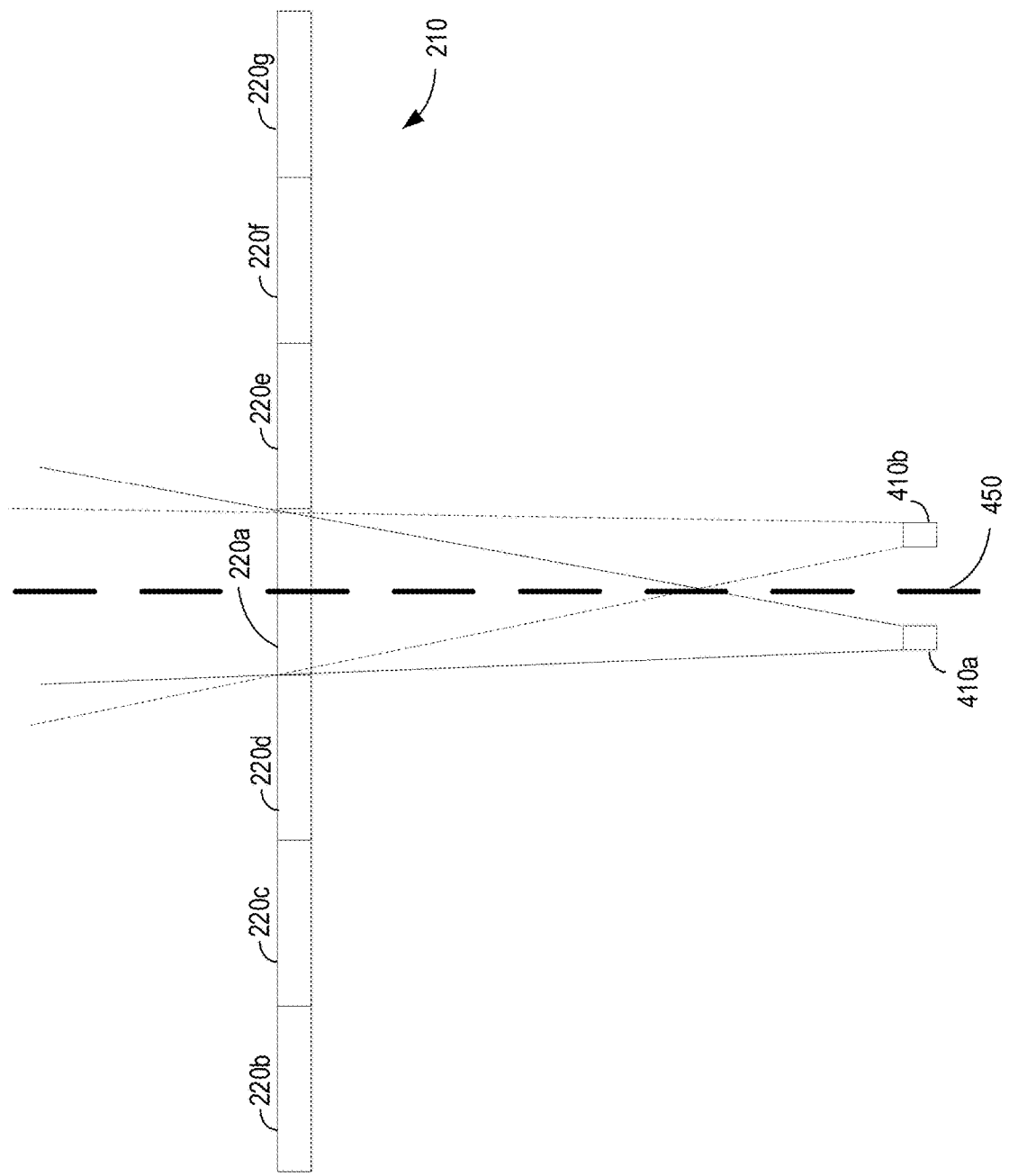

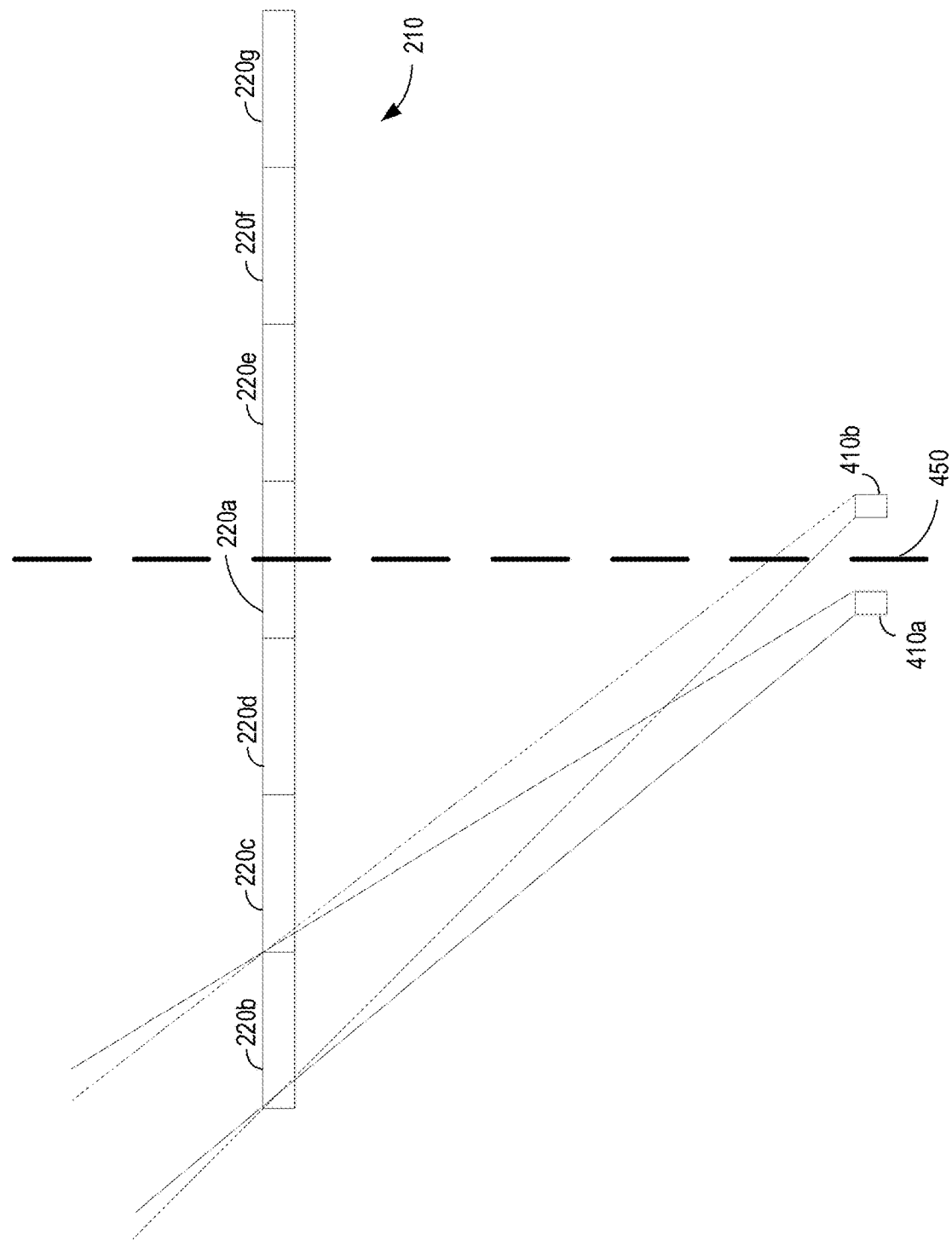

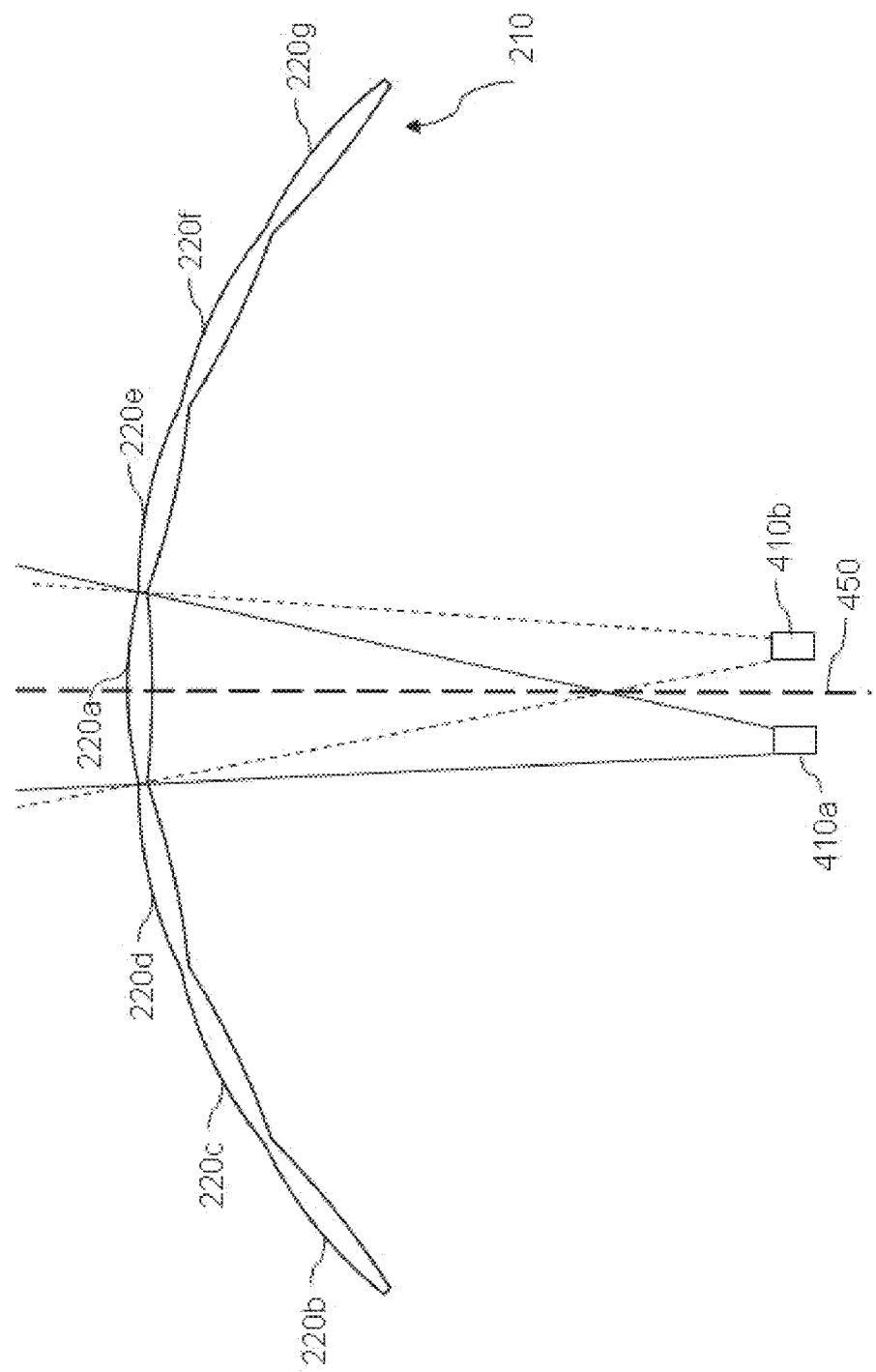

| MOUNTING HEIGHT (FEET) | MOTION SENSOR FOV COVERAGE DIAMETER (FEET) | | |
|---|---|---|---|
| | HIGH SENSITIVITY | MEDIUM SENSITIVITY | LOW SENSITIVITY |
| 10 | 20 | 10 | 8 |
| 12 | 26 | 14 | 12 |
| 14 | 28 | 15 | 13 |
| 20 | 38 | 18 | 14 |

FIG. 15

ELECTRICAL FIELD OF VIEW CONTROL FOR A PASSIVE LIGHT SENSOR

CROSS-REFERENCE TO RELATED APPLICATION

This application is a Continuation-in-Part of U.S. patent application Ser. No. 16/857,690 entitled "ELECTRICALLY CONTROLLING THE FIELD OF VIEW OF A PASSIVE INFRARED SENSOR," filed Apr. 24, 2020, the contents of which are incorporated herein in their entirety and for all purposes.

BACKGROUND

PIR (Passive Infra-Red) Sensors are ubiquitous and are one of the most fundamental building blocks for motion detection. They are widely used in the field of home/office automation and security, for example. PIR Motion Sensors appear in numerous products such as discrete motion sensing modules for security/intrusion detection, light fixtures, porch light systems, smart lights, and vending machines, among other things. All PIR Motion Sensors have a detection area called a Field of View (FoV), typically expressed as a circular diameter at product level or in angular degrees at raw sensor level. Design engineers typically develop their motion sensing products with a specific target FoV in mind. For example, the FoV of a motion sensor in a porch light is expected to be much larger than the FoV of a discrete indoor motion sensor module.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a pyroelectric sensing element 410, generally, as opposed to discussion of particular instances of pyroelectric sensing elements 410*a*, 410*b*, 410*c*, 410*d*).

FIG. 2A and FIG. 2B are schematics illustrating an example motion sensing device configured with a relatively wide and narrow fields of view, respectively, as viewed from the side, according to one or more embodiments of the present disclosure.

FIG. 8A and FIG. 8B are schematics illustrating examples of pyroelectric sensing elements receiving infrared radiation via a central lens-let and an off-axis lens-let, respectively, of a substantially flat lens as viewed from the side in cross-section, according to one or more embodiments of the present disclosure.

FIG. 9A and FIG. 9B are schematics illustrating examples of pyroelectric sensing elements receiving infrared radiation via a central lens-let and an off-axis lens-let, respectively, of a domed lens as viewed from the side in cross-section, according to one or more embodiments of the present disclosure.

FIG. 15 is a table illustrating a mapping field of view sizes to sensitivity settings, according to one or more embodiments of the present disclosure.

DETAILED DESCRIPTION

Figure 1B:
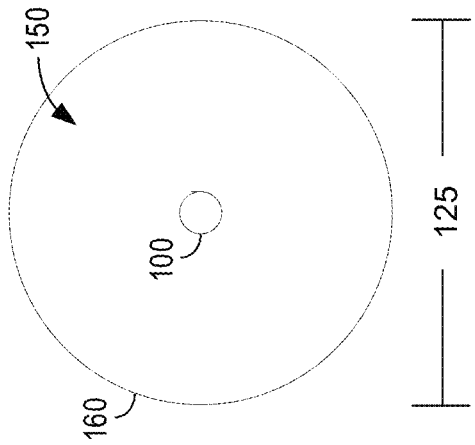
FIG. 1B is a schematic illustrating a top view of an example field of view of a motion sensing device according to one or more embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

To design a motion sensing system having an FoV targeted for a specific application, an appropriate lens may be selected. However, once such a system is developed, it is difficult for that FoV to be changed. To enable provide motion sensing solutions for a wide variety of applications, engineers traditionally have developed a separate product stock-keeping unit (SKU) having a different optical and mechanical design that caters to each distinct application. In other cases, engineers apply aftermarket mechanical components to reduce the effective FoV of the motion sensing system, such as a blinder or tape. Embodiments of the present disclosure recognize that dynamic FoV control would be advantageous, particularly if such can be provided by a device without having to change aspects of the optical and mechanical design.

Particular embodiment of the present disclosure enable dynamic FoV control by electrically controlling the sensitivity of PIR motion sensors, e.g., without the need of expensive optical or mechanical changes. Such embodiments are generally compatible with a wide variety of PIR sensors. In some embodiments, digital PIR sensors can generally be controlled in the manner that will be described herein such that the FoV may be electrically adjusted. For the motion sensing applications, pyroelectric PIR sensors are the prominent type and digital topology has gained more popularity in recent past. In some embodiments, an analog PIR sensor can generally be controlled in a manner described herein such that the FoV may be electrically adjusted.

A Field of View (i.e., FoV) is a space within which a device or sensor is responsive to electromagnetic radiation. The particular spectrum of electromagnetic radiation to which a particular device or sensor responds may depend on its design. Although many of the examples below will focus on PIR sensors that respond to electromagnetic radiation in the infrared spectrum, it should be understood that other embodiments additionally or alternatively include sensors that respond to electromagnetic radiation in other parts of the electromagnetic spectrum (e.g., the visible light spectrum, the ultraviolet spectrum).

Figure 1A:
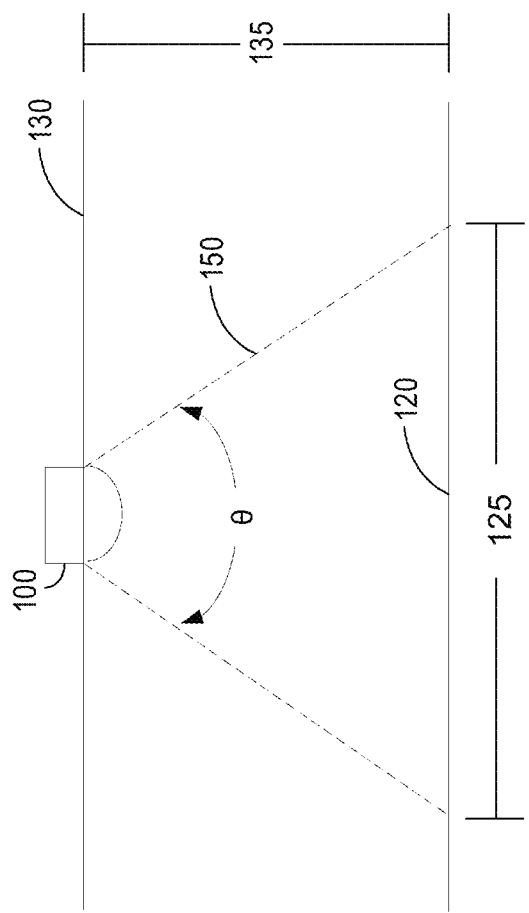
FIG. 1A is a schematic illustrating a side view of an example field of view of a motion sensing device according to one or more embodiments of the present disclosure.

FIG. 1A illustrates a side view of an FoV 150 of an example motion sensing device 100. In this example, the FoV 150 widens in a cone as it extends away from the motion sensing device 100, such that a diameter 125 of the FoV 150 increases at increasing distances. In this example, the motion sensing device 100 is oriented to cast its FoV 150 toward an opposing target surface 120. The distance 135 between the motion sensing device 100 and the target surface 120 may be referred to as a mounting distance of the motion sensing device 100. According to other embodiments the motion sensing device may be mounted to cast a FoV that extends indefinitely. For example, the motion sensing device may be mounted on an outdoor wall facing an open area.

The motion sensing device 100 is mounted to an adjacent surface 130. In this example, the adjacent surface 130 is the ceiling of a room. As will be discussed in further detail below, in other embodiments, the adjacent surface 130 may be that of a light fixture or other device (not shown in FIG. 1A).

The distance 135 of the motion sensing device 100 from its corresponding target surface 120 (i.e., in this example, the floor) may be described as its mounting height. That said, in other examples, the motion sensing device 100 may be mounted at other angles (e.g., laterally) and oriented to cast its FoV 150 over other surfaces (e.g., an opposing wall).

The size of a device's FoV 150 is traditionally discussed in one of two ways; i.e., as having an angular FoV of some number of degrees θ, or as having a linear FoV of some diameter 125 at a given distance 135. FIG. 1A shows the angle θ and diameter 125 of a FoV 150 at a given mounting distance from a target surface 120.

FIG. 1B illustrates a top view of the FoV 150 relative where the motion sensing device 100 is positioned. As viewed from the top, the peripheral end 160 of the FoV 150 surrounding an area of the target surface 120 covered by the FoV 150 can be seen. This area is referred to herein as the coverage area of the FoV 150 over the target surface 120. Presuming a target surface 120 that is normal to the central axis of the FoV 150, if the angular FoV is known, then the linear FoV (i.e., diameter 125) corresponding to the coverage area at a given mounting distance can be determined by Equation 1 below:

linear FoV=2×mounting distance×tan(Angular FoV/2) (Eq. 1)

Correspondingly, if the mounting distance and diameter 125 of the coverage area are known, the angular FoV 150 can be determined by Equation 2 below:

Angular FoV=2×tan$^{-1}$((coverage diameter/2)/mounting distance) (Eq. 2)

As shown in FIG. 2A and FIG. 2B, the motion sensing device 100 may comprise a PIR sensor 200 that may be electrically controlled to widen or narrow the FoV. FIG. 2A illustrates the motion sensing device 100 configured with a relatively high sensitivity such that the FoV 150 is relatively wide. FIG. 2B illustrates the motion sensing device 100 configured with a relatively low sensitivity such that the FoV 150 is relatively narrow. As will be explained in greater detail below, changing the FoV 150 may not only cause a coverage area to expand or contract, but may also cause more or less of a lens 210 of the motion sensing device 100 to be included in the FoV 150 about a primary sensing axis of the motion sensing device 100. As shown in FIG. 2A and FIG. 2B, the example motion sensing device 100 comprises a lens 210 and a sensor housing 230. The lens 210 is retained by the sensor housing 230 and disposed over the PIR sensor 200. The lens 210 comprises a plurality of lens-lets 220, each of which is configured to direct light toward pyroelectric sensing elements (not shown in FIG. 2A and FIG. 2B) within the PIR sensor 200. When the FoV 150 is relatively wide, as in FIG. 2A, the FoV 150 around the primary sensing axis 450 is expanded. Correspondingly, more of the lens-lets 220 are included within the FoV 150. When the FoV 150 is relatively narrow, as in FIG. 2B, the FoV 150 around the primary sensing axis 450 is reduced. Correspondingly, fewer of the lens-lets 220 are included within the FoV 150.

Figure 2D:
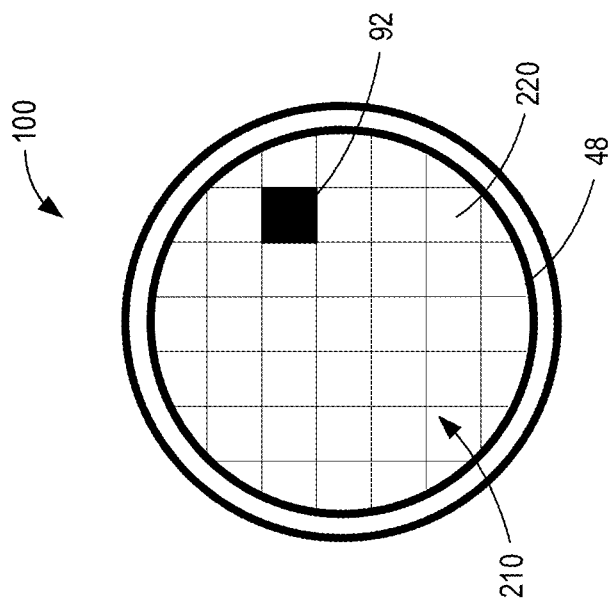
FIG. 2D is a schematic illustrating lens-lets of a flat lens, according to one or more embodiments of the present disclosure.
Figure 2C:
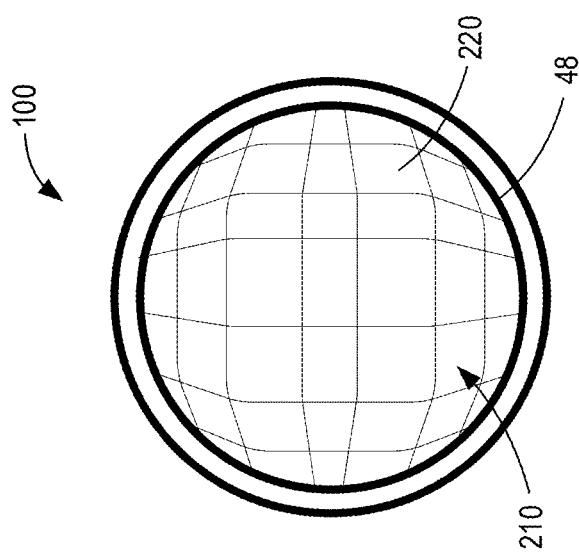
FIG. 2C is a schematic illustrating lens-lets of a domed lens, according to one or more embodiments of the present disclosure.
Figure 3:
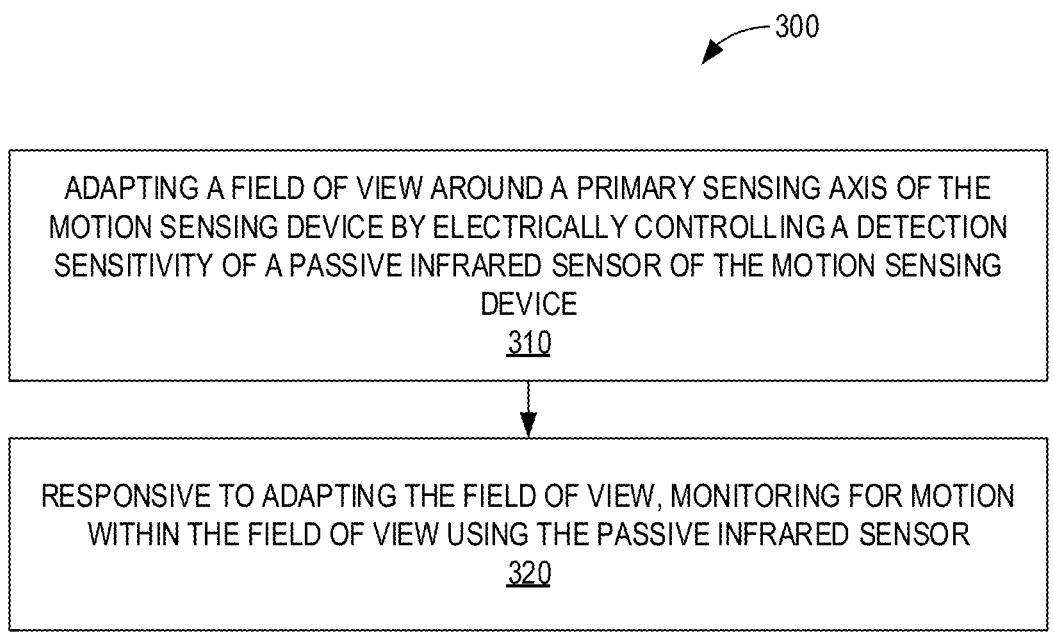
FIG. 3 is a flow diagram illustrating an example method implemented in a motion sensing device according to one or more embodiments of the present disclosure.

Different lens 210 designs in accordance with various embodiments may comprise different shapes. In some embodiments, the lens 210 is domed and has a round outer periphery 48, e.g., as shown in FIG. 2C. In other embodiments, the lens 210 is substantially flat, as shown in FIG. 2D. Moreover, particular lens designs may be shaped to wide or narrow the FoV 150 of the motion sensing device 100. For example, the lens 210 may be configured such that the motion sensing device 100 has a default FoV and/or so that adjustment through a wide range of possible FoVs are supported by electrical control over detection sensitivity of the PIR sensor 200. Additionally or alternatively, the motion sensing device 100 may include mechanical blinders 92 (e.g., fixed opaque surfaces, stickers, wider or narrower apertures) on, over, and/or under the lens 210 to block light from reaching the PIR sensor 200. In particular, a mechanical blinder 92 may be disposed to render one or more selected lens-lets 220 inoperative to direct light toward the PIR sensor 200, e.g., such that the FoV 150 is partially blinded within a portion of the coverage area, as shown in the example of FIG. 2D. Further examples of lenses 210 in accordance with embodiments of the present disclosure will be discussed in further detail below.

Many of the embodiments disclosed herein enable dynamic FoV control by software and/or firmware control over the detection sensitivity of the PIR sensor 200, e.g., such that a common electrical, optical, and mechanical design may be used to detect motion within an appropriately sized coverage area up to some maximum FoV and/or down to some minimum FoV as may be permitted or possible in view of the motion sensing device's overall design. Such a motion sensing device 100 may be suitable for deployment to a wide variety of locations and/or support a wide variety of motion sensing applications. Such a motion sensing device 100 may additionally or alternatively simplify inventory management, customer experience, and/or technical support operations as businesses will only need to support a single motion sensing device 100 rather than numerous custom built devices of varying capabilities that may, e.g., be difficult to keep track of and support.

Particular embodiments of the present disclosure, for example, include a method 300 implemented in a motion sensing device 100. The method 300 comprises adapting a field of view 150 around a primary sensing axis 450 of the motion sensing device 100 by electrically controlling a detection sensitivity of a passive infrared sensor 200 of the motion sensing device 100 (block 310). The method further comprises, responsive to adapting the field of view 150, monitoring for motion within the field of view 150 using the passive infrared sensor 200 (block 320).

Figure 4:
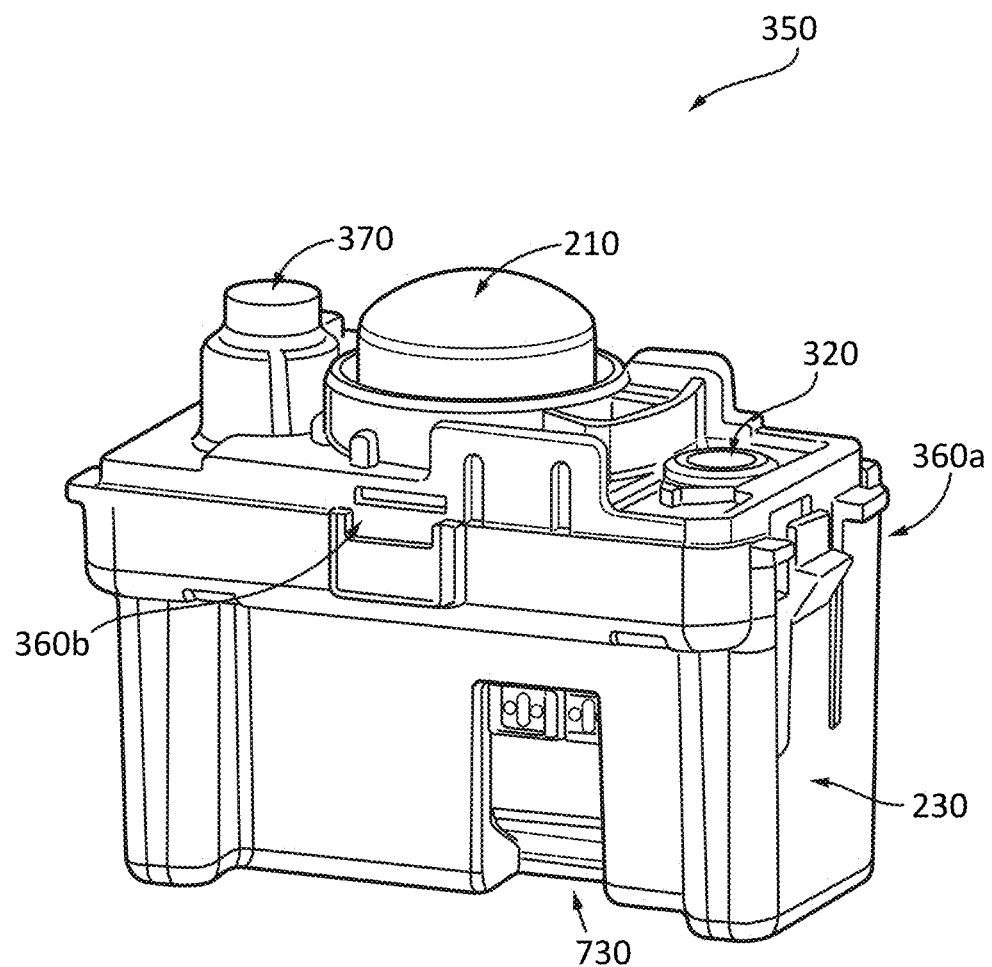
FIG. 4 is an isometric drawing of an example motion sensing device according to one or more embodiments of the present disclosure.

One particular example of a motion sensing device 100 that may be suitably adapted to implement embodiments of the present disclosure (e.g., the method 300) may be a Cree Lighting® SmartCast® Wireless Integration Module (WIM) as shown in FIG. 4. The example WIM 350 shown in FIG. 4 is a modular system intended to be mounted into an existing light fixture or be mounted directly into the ceiling and leverage Cree Lighting® SmartCast® technology to automate setup. Embodiments of the present disclosure include a WIM 350 that offers dynamic software control over the FoV 150 of a PIR sensor 200, thereby supporting a variety of FoV 150 configurations using a common electrical, mechanical and optical design.

As shown, this particular WIM 350 includes an ambient light sensor (not shown) configured to detect an amount of ambient light and a PIR sensor 200 (not shown in FIG. 4) configured to detect infrared radiation. The WIM further comprises a light pipe 370 disposed over the ambient light sensor, and a lens 210 disposed over the PIR sensor 200. In this example, the top surface of the light pipe 370 is substantially flat, whereas the lens 210 over the PIR sensor 200 is domed.

The WIM 350 also comprises a sensor housing 230 that retains the lenses 210a, 210b over their respective sensors. Tabs 360a in the sensor housing 230 permit the WIM 350 to be retained, e.g., by a standard junction box or retention bracket for mounting the WIM 350 in a wall or ceiling. Tabs 360b in the sensor housing 230 permit a faceplate (not shown) to be retained over the sensor housing 230. The WIM 350 also includes a reset button 320 configured to reset a configuration of the WIM 350, and interface circuitry 730 configured to exchange signals with a remote device.

In this particular example, the interface circuitry 730 of the WIM 350 is a Digital Addressable Lighting Interface (DALI) interface configured to be communicatively connected to a two-wire serial bus (not shown). The DALI interface is configured to draw power from the serial bus and to exchange signals bidirectionally with a remote device over the serial bus. The DALI interface is addressable by a configurable address, and signaling may be effectuated, e.g., using Manchester coding (i.e., encoding zeros and ones on the bus by dropping and raising voltage on the bus, respectively). The line may additionally or alternatively be set to idle by keeping voltage steady (e.g., for the full duration of a given clock cycle, without change).

Although the example motion sensing device 100 of FIG. 4 includes interface circuitry 730 that is connected to a wired bus, as will be explained further below, the interface circuitry 730 may additionally or alternatively comprise wireless communication circuitry (e.g., radio circuitry compatible with one or more wireless communication standards, including but not limited to, Wi-Fi, Bluetooth®, Near Field Communication (NFC), and/or other wireless technologies). The motion sensing device 100 may also be powered by any appropriate power source (e.g., battery, main power).

Figure 5:
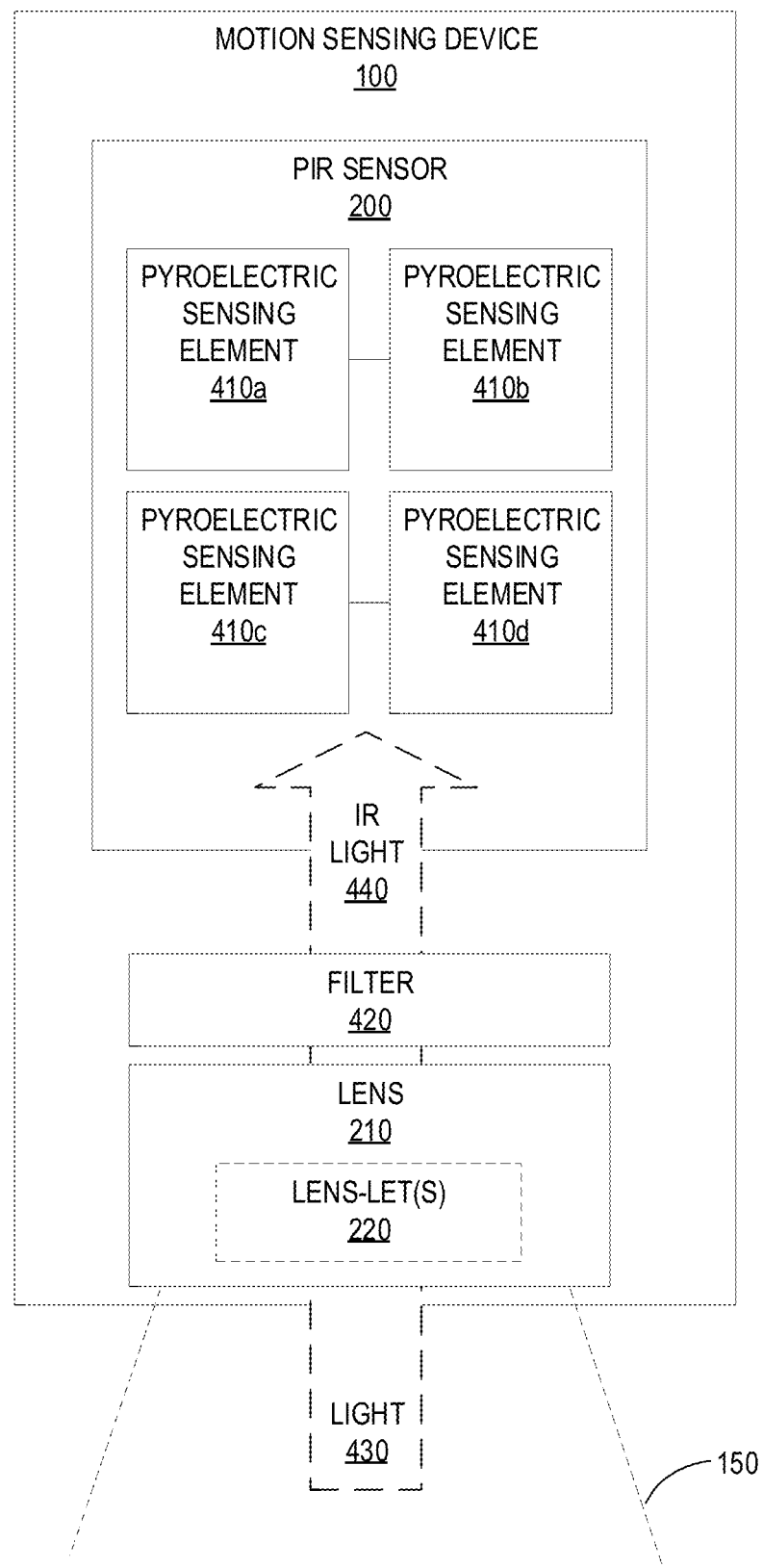
FIG. 5 is a schematic illustrating an example motion sensing device according to one or more embodiments of the present disclosure.

FIG. 5 schematically illustrates an example motion sensing device 100, as well as how light 430 (e.g., or portions thereof, such as Infra-Red (IR) light 440) may generally interact with particular components thereof. The motion sensing device 100 of FIG. 5 comprises a lens 210, a filter 420, and a PIR sensor 200. The PIR sensor 200 comprises a plurality of pyroelectric sensing elements 410a-d. In this example, the PIR sensor 200 comprises two pairs of pyroelectric sensing elements 410a-b, 410c-d arranged in a two-by-two grid (hereinafter referred to as a quad arrangement). According to other particular embodiments, the PIR sensor 200 comprises a single pair of pyroelectric sensing elements 410a-b arranged side-by-side (hereinafter referred to as a dual arrangement). Yet other embodiments may include any number of pyroelectric sensing elements 410, but most commonly includes an even number of pyroelectric sensing elements 410 configured in pairs.

Light 430 from within the FoV 150 is received by the motion sensing device 100 at the lens 210, which passes the IR light 440 through the filter 420 and on to the PIR sensor 200. The PIR sensor 200 receives the filtered light 430 at one or more of the pyroelectric sensing elements 410a-d. In this regard, the filter 420 may filter the light 430 such that only the IR light 440 (and/or other wavelengths of the light 430) are passed to the PIR sensor. For example, the filter 420 may reduce or eliminate wavelengths outside of the particular IR spectrum that is detectable by the pyroelectric sensing elements 410a-d. Although the filter 420 is illustrated in this example as being disposed between the lens 210 and the PIR sensor 200, other embodiments may position the filter over the lens 210, within the PIR sensor 200, or lack a filter 420 entirely. More detail regarding how the motion sensing device 100 transfers IR light 440 to the pyroelectric sensing elements 410 of the PIR sensor 200 will be discussed in further detail below.

The lens 210 may take a variety of forms and come in a variety of complexities, according to various embodiments of the present disclosure. Among other things, the lens 210 may be substantially flat, domed, and/or ridged, in whole or in part. Many embodiments of the lens 210 comprise a plurality of lens-lets 220, each of which is shaped to direct infrared radiation toward the pyroelectric sensing elements 410 of the PIR sensor 200.

The pyroelectric sensing elements 410 of the PIR sensor 200 work based on pyroelectricity. Pyroelectricity is ability of certain crystals to generate a temporary voltage when they are heated or cooled. Heat sources (e.g., warm-blooded animals) generate Infrared (IR) radiation. When the pyroelectric sensing elements 410 inside the PIR sensor 200 are exposed to IR radiation (such as the IR radiation produced by a human body), they generate voltage that are a basis upon which the PIR sensor 200 functions. As discussed above, most embodiments of the PIR sensor 200 are expected to have pyroelectric sensing elements 410 configured in a dual or quad arrangement. According to most embodiments, the internal circuitry of the PIR sensor 200 is configured to use the pyroelectric sensing elements 410 in pairs. The motion sensing device 100 produces a differential voltage between a pair of pyroelectric sensing elements 410a-b, 410c-d, and based on this differential voltage, output is or is not generated.

For example, in response to the differential voltage between a pair of pyroelectric sensing elements 410a-b, 410c-d being within (i.e., not in excess of) a threshold, the motion sensing device 100 may refrain from generating output. Correspondingly, in response to the differential voltage between the pair of pyroelectric sensing elements 410a-b, 410c-d being in excess of a threshold (e.g., the same or a different threshold), the motion sensing device 100 may generate output indicating that motion has been detected.

For purposes of this disclosure, the threshold with respect to a differential voltage defines a maximum voltage magnitude (i.e., regardless of whether positive or negative) or a range of voltage values comprising maximum and minimum values that the differential voltage is either within (i.e., under the maximum voltage magnitude regardless of sign or between the maximum and minimum values) or exceeds (i.e., over the maximum voltage magnitude regardless of sign or outside of the maximum and minimum values). By electrically controlling (e.g., configuring) the threshold amount of differential voltage that controls whether or not the PIR sensor 200 generates or does not generate output, embodiments of the present disclosure electrically control the detection sensitivity of the PIR sensor 200, which may further be used to dynamically control the FoV 150 around a primary sensing axis of the motion sensing device 100, as will be shown in greater detail below.

Figure 6:
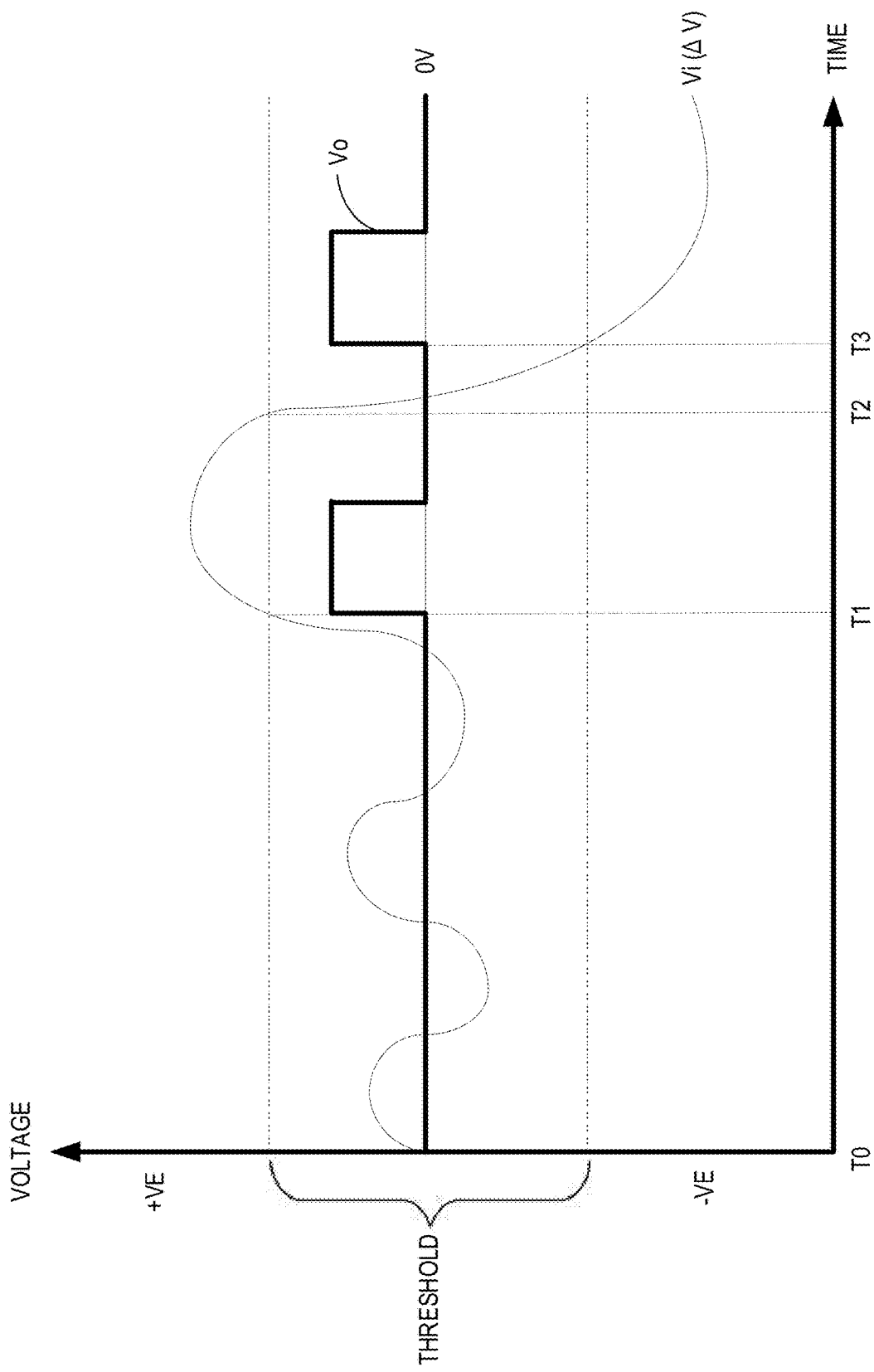
FIG. 6 is a graph illustrating an example of output signaling generated based on a differential voltage, according to one or more embodiments of the present disclosure.

FIG. 6 illustrates an example of controlling an output signal (Vo) based on whether or not a differential voltage (Vi (ΔV)) is in excess of a voltage threshold. As discussed above, the differential voltage may be produced by a PIR sensor 200 of a motion sensing device 100 in response to the infrared radiation received from a heat source moving within an FoV 150 of a motion sensing device 100. According to particular embodiments, the PIR sensor 200 may output the differential voltage to other circuitry comprised in the motion sensing device 100, which uses the differential voltage to generate the output signal shown in FIG. 6 (e.g., for transmission to a remote device). Alternatively, the PIR sensor 200 may generate the differential voltage, and based thereon, generate the output signal of FIG. 6, which other circuitry within the motion sensing device 100 may use to control an output signal of the motion sensing device. In either case, the output signal of the motion sensing device 100 is controlled based on whether or not a pair of pyroelectric sensing elements 410 in the PIR sensor 200 generates the differential voltage in excess of the voltage threshold.

In this example, one of the pyroelectric sensing elements 410a in the pair is configured to generate a first voltage (e.g., a positive voltage) responsive to the presence of a heat source within one or more zones within the FoV 150 of the motion sensing device 100. The other pyroelectric sensing element 410b in the pair is configured to generate a second voltage (e.g., a negative voltage) responsive to the presence of a heat source within one or more other zones within the FoV 150 of the motion sensing device 100. For purposes of concisely referring to these zones, a zone associated with a pyroelectric sensing element 410 that produces a positive voltage or a negative voltage in response to detecting infrared radiation will hereinafter be referred to as a positive or negative zone, respectively.

The motion sensing device 100 generates a differential voltage by combining the voltages produced by the pair of pyroelectric sensing elements 410a-b. For example, when both pyroelectric sensing elements 410a-b detect the same amount of ambient infrared radiation in the FoV 150, they may each produce voltage having the same magnitude and opposite directionality, such that the difference between the voltages is zero. In this way, the effect of ambient infrared radiation in the FoV 150 may be effectively ignored. Thus, the differential voltage may be a mechanism that reflects the extent to which infrared radiation is disproportionately affecting the pyroelectric sensing elements 410a-b in the pair. As will be discussed further below, this disproportionate effect may be due to the infrared radiation being unevenly distributed within the FoV 150 (e.g., concentrated within a particular zone of the FoV 150).

In FIG. 6, the differential voltage produced by the pair of pyroelectric sensing elements 410a-b is shown over time. As shown, the infrared radiation detected by the pyroelectric sensing elements 410a-b causes the differential voltage to fluctuate from time T0 to time T1. Because these fluctuations of differential voltage occur within the threshold (shown in FIG. 6 as a range between positive and negative threshold values), no indication that something has been detected is output.

There are numerous potential causes for minor fluctuations in the differential voltage. For example, small amounts of infrared radiation emitted by a heat source outside of the FoV 150 may be reflecting off of particular surfaces within the FoV 150 that are more directly observable by one of the paired pyroelectric sensing elements 410a as compared to the other 410b. Alternatively, the fluctuations may be caused by a relatively small heat source moving into the FoV 150 (e.g., a small cat) that the motion sensing device 100 has been calibrated or designed to ignore. Another cause for the fluctuations may be due to an uneven circulation of warm air within the room. Whatever the cause, the detection sensitivity prevents these minor fluctuations from triggering an output signal. In this regard, a properly calibrated detection sensitivity may prevent the generation of output signals that indicate the detection of motion in response to events that are not of concern to the user.

At time T1, a heat source enters a positive zone. In response, the pair of pyroelectric sensing elements 410a-b produces a differential voltage in excess of the threshold. In particular, the differential voltage is above the maximum voltage value of the threshold. Accordingly, an output signal is generated indicating that infrared radiation has been detected (in this example, by setting an output line carrying Vo high for a fixed duration). The motion sensing device 100 may send Vo (or another signal based thereon, such as a command signal) to a remote device, e.g., to notify the remote device that the motion has been detected, to trigger an alarm, to command a light fixture to flash, and/or produce other output signaling.

At time T2, the heat source leaves the positive zone. At time T3, the heat source moves into the negative zone. In response, the pair of pyroelectric sensing elements 410a-b produces a differential voltage that in excess of the threshold (i.e., a differential voltage below the negative threshold value). Accordingly, the output signal indicating that infrared radiation has been detected is again generated. As before, the motion sensing device 100 may send Vo to a remote device, or may generate and send another output signal based thereon in response to the PIR sensor 200 generating the Vo of FIG. 6, depending on the embodiment.

Of note, in this example, between the times T2 and T3 in which the heat source was in transit from the positive zone to the negative zone, the infrared radiation detected by the pyroelectric sensing elements 410a-b is shown to be relatively even, such that the differential voltage between the pyroelectric sensing elements 410a-b is within the threshold (e.g., as shown in FIG. 6). Correspondingly, the output signal indicating the detection of infrared radiation is not generated during that period.

It may be further noted that, although the output signal is provided in response to the differential voltage being in excess of the threshold, in some embodiments, the output signal is produced for a limited (e.g., fixed) duration despite the differential voltage continuing to be in excess of the threshold for a longer period (e.g., from time T1 to time T2). Thus, in some embodiments, once the output signal has been generated, the PIR sensor 200 (or motion sensing device 100) may refrain from generating the output signal again until the differential voltage recovers from hysteresis to a value not in excess of the threshold. For example, consistent with FIG. 6, the PIR sensor 200 may generate the output signal for the first time at time T1 (when the heat source enters the positive zone), and refrain from generating the output signal again until the differential voltage returns to values within the threshold at time T2 and subsequently exceeds the threshold again at time T3. That said, other embodiments may continue to generate the output signal for as long as the differential voltage is in excess of the threshold (e.g., by generating a continuous output signal or repetitively generating the output signal).

Figure 7:
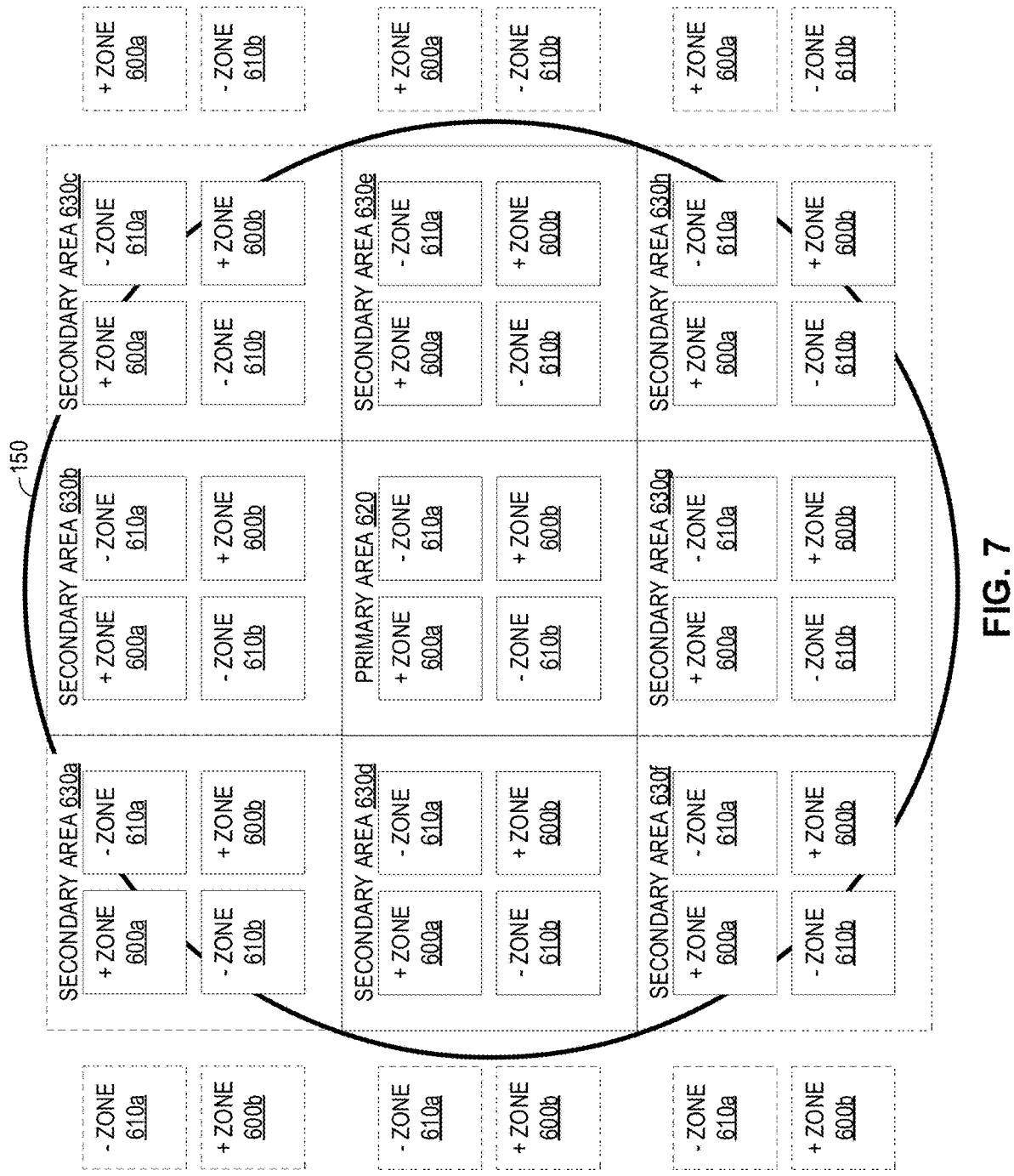
FIG. 7 is a schematic illustrating an example of zones within a field of view associated with respective pyroelectric sensing elements of a PIR sensor, according to one or more embodiments of the present disclosure.

An example of different zones 600, 610 within the FoV 150 that correspond to different ones of the pyroelectric sensing elements 410 of a PIR sensor 200 is illustrated in FIG. 7. The closer a heat source is to a given zone 600, 610, the more the corresponding pyroelectric sensing element 410 of the PIR sensor 200 will receive infrared radiation from the heat source and produce voltage in response. Some of the zones 600, 610 are "positive zones" 600a, 600b, which is the term herein used to refer to zones 600, 610 that are associated with a pyroelectric sensing element 410a, 410d configured to produce a positive voltage in response to infrared radiation. The other zones are "negative zones" 610a, 610b, which is the term herein used to refer to zones 600, 610 associated with a pyroelectric sensing element 410b, 410c configured to produce a positive voltage in response to infrared radiation.

In this example, each of the positive zones 600a, 600b is associated with pyroelectric sensing element 410d, 410a, respectively. Each of the negative zones 610a, 610b is associated with pyroelectric sensing element 410c, 410b, respectively. This association between zones 600, 610 and pyroelectric sensing elements 410 relates to which of the pyroelectric sensing elements 410, for a given zone 600, 610 will respond by producing voltage to the greatest extent relative to the other pyroelectric sensing elements 410. In other words, a heat source emitting infrared radiation from within a given zone 600, 610 will tend to disproportionately affect the pyroelectric sensing element 410 associated with that zone 600, 610 as compared to the others. This association between the zones 600, 610 and the pyroelectric sensing elements 410 of the PIR sensor 200 may vary depending on the physical arrangement of the components of the motion sensing device 100 and the design of the lens 210, as will be discussed in further detail below.

The zones within the FoV 150 are arranged into areas 620, 630. Each area 620, 630 includes one zone 600, 610 per pyroelectric sensing element 410. In this example, the PIR sensor 200 has four pyroelectric sensing elements 410a-d in a quad arrangement (i.e., arranged into two pairs). Accordingly, each area comprises four zones 600a-b, 610a-b.

The primary sensing axis of the motion sensing device 100 is the axis from which a heat source emitting a given quantum of infrared radiation at a given distance from the motion sensing device 100 will be unable to pass more of that infrared radiation through the lens 210 and onto the pyroelectric sensing elements 410a-d, collectively, by moving to any other axis. In this example, the primary sensing axis is normal to a plane extending through the pyroelectric sensing elements 410a-d and extends through the center of the FoV 150.

The area 620, 630 that intersects the primary sensing axis is herein referred to as the "primary area" 620. The primary area 620 is the area 620, 630 within the FoV 150 in which detection by the PIR sensor 200 is strongest. The other areas 620, 630 within the FoV 150 are herein referred to as secondary areas 630a-h. The secondary areas 630a-h do not intersect with the primary sensing axis. Notwithstanding, each of the secondary areas 630a-h comprises zones 600, 610 that correspond to the pyroelectric sensing elements 410, e.g., by operation of the lens 210 (to be discussed in further detail below). These secondary areas 630a-h are the areas 620, 630 within the FoV 150 in which detection by the PIR sensor 200 is relatively weaker than that of the primary area 620.

Some of the zones 600, 610 depicted in FIG. 7 are entirely outside of the FoV 150. These zones 600, 610 represent zones that could be comprised in additional secondary areas 630 of detection within the FoV 150, if the FoV 150 were to be widened. Just as detection is weaker in the secondary areas 630a-h relative to the primary area 620, detection may be weaker in the additional secondary areas 630 added by increasing the size of the FoV 150 relative to the secondary areas 630a-h that are closer to the primary sensing axis 450. This weakening effect on detection at further distances from the primary sensing axis 450 may, e.g., be due to a reduction in IR light 440 being received by the pyroelectric sensing elements 410. This reduction may be due to some property of the lens 210 and/or one or more lens-lets 220 therein (e.g., differences between lens-lets 220 that are more central as compared to lens-lets 220 that are more peripheral), the angle at which the IR light 440 arrives. In particular, such factors may result in each pair of pyroelectric sensing elements 410a-b, 410c-d generating a monotonically decreasing amount of differential voltage as the given quantum of infrared radiation is positioned at increasing distances away from the primary sensing axis 450.

Correspondingly, if the FoV 150 were to be narrowed, particular zones 600, 610 (and possibly entire secondary areas 630) would fall outside of the FoV 150, such that a given quantum of infrared radiation from those zones 600, 610 would no longer be detected by their associated pyroelectric sensing elements. That is, while zones 600, 610 outside of the FoV may be able to pass infrared radiation to the pyroelectric sensing elements 410a-d to some extent, the passed infrared radiation would be received a such a high angle of incidence or such a degree of loss that, given the detection sensitivity of the PIR sensor 200, positive detection would not occur. Although FIG. 7 only illustrates zones 600, 610 outside of the FoV 150 to the left and the right for clarity of the illustration, it should be appreciated that such zones may surround the FoV 150 in any direction, such that sufficiently increasing the diameter 125 of the FoV 150 (e.g., by electrically control) would incorporate zones in each lateral direction into the FoV 150.

As discussed above, each pair of pyroelectric sensing elements 410a-b, 410c-d may include one pyroelectric sensing element 410a, 410d that produces a positive voltage (respectively) and one pyroelectric sensing element 410b, 410c that produces a negative voltage (respectively) in response to receiving infrared radiation. As shown by the arrangement of zones in the example of FIG. 7, the pyroelectric sensing elements 410a-d may be arranged in a two-by-two grid (i.e., a quad arrangement). In such an arrangement, a top one of the pyroelectric sensing elements pairs 410a-b may be arranged horizontally such that the positive voltage producing pyroelectric sensing element 410a is disposed to the left of its paired negative voltage producing pyroelectric sensing element 410b. Further, a bottom one of the pyroelectric sensing element pairs 410c-d may also be arranged horizontally such that the negative voltage producing pyroelectric sensing element 410c is disposed to the left of its paired positive voltage producing pyroelectric sensing element 410d.

It should be noted that other embodiments of the PIR sensor 200 may include quad arrangements in which the positive-negative pair is below the negative-positive pair. In yet other embodiments, the positive voltage producing pyroelectric sensing elements 410a, 410d are aligned with each other (e.g., to the left or right), and the negative voltage producing pyroelectric sensing elements 410b, 410c are aligned with each other on the other side. In still yet other embodiments, rather than each pair being arranged horizontally as in this example, other examples may each arrange each pair vertically. Notwithstanding, the most typical arrangement of pyroelectric sensing elements 410 expected to be used in practical applications is represented by the corresponding arrangement of positive and negative zones 600, 610 shown in FIG. 7; namely, evenly-spaced pyroelectric sensing elements 410 in which neighboring pairs reverse which pyroelectric sensing element 410 produces the positive voltage and which produces the negative voltage.

FIG. 8A and FIG. 8B schematically illustrates a cut-away view through the center of an example lens 210 such that operation of the lens 210 to direct IR light 440 from respective directions onto pyroelectric sensing elements 410a, 410b of the PIR sensor 200 may be observed from the side. The lens 210, according to this example, comprises a plurality of lens-lets 220a-g along a substantially flat plane. Lens-let 220a is a central lens-let of the lens 210. The central lens-let 220a is aligned with the primary sensing axis 450, such that infrared radiation received by the lens 210 from the primary sensing axis 450 is passed to the pyroelectric sensing elements 410a-b at an average angle of incidence that is closer to 0° than infrared radiation passing through any of the other lens-lets 220 to the pyroelectric sensing elements 410a-b.

The other lens-lets 220b-g of this example lens 210 are not aligned to the primary sensing axis and are hereinafter referred to as "off-axis lens-lets" 220b-g. As shown in FIG. 8B, these off-axis lens-lets 220b-g are less effective at transferring infrared radiation to the pyroelectric sensing elements 410a-b, because the receiving surfaces of the pyroelectric sensing elements 410a-b receive infrared radiation from these off-axis lens-lets 220b-g at a higher angle of incidence relative to the infrared radiation received from the central lens-let 220a. This results in aberrated signal onto the pyroelectric sensing elements 410a-b and a reduction in IR energy transfer efficiency.

It should be further noted that the off-axis lens-lets 220b-g produce an astigmatism on the pyroelectric sensing elements 410a-b, which may further aberrate signal. Astigmatism is the aberrated defect of imaged or collected signal on a sensor by the relatively tilted alignment with respect to a lens element, which in this example reduces the detection sensitivity of the pyroelectric sensing elements 410a-b with respect to the off-axis lens-lets 220b-g. As the off-central axis angle increases, the astigmatism aberration worsens resulting in images getting increasingly blurry or IR energy being reduced on the pyroelectric sensing elements 410 as progressively peripheral off-axis lens-lets 220b-g are used.

As a result of one or more of the factors discussed above, the pyroelectric sensing elements 410a-b may generate a monotonically decreasing amount of differential voltage as a given quantum of infrared radiation is positioned at increasing distances away from the primary sensing axis 450. Accordingly, in order for the PIR sensor 200 to detect infrared radiation received via an off-axis lens-let 220b-g to the same degree as the central lens-let 220a, a higher detection sensitivity is required. According to various embodiments of the present disclosure, this higher detection sensitivity is accomplished by configuring the PIR sensor 200 with a lower detection threshold, which widens the effective FoV 150 of the PIR sensor about the primary sensing axis 450.

Conversely, to configure the PIR sensor 200 to disregard infrared radiation received via the central lens-let 220a to the same degree as a given off-axis lens-let 220b-g, a lower detection sensitivity is required. According to various embodiments of the present disclosure, this lower detection sensitivity is accomplished by configuring the PIR sensor 200 with a higher detection threshold, which narrows the effective FoV 150 of the PIR sensor about the primary sensing axis 450.

Accordingly, by controlling detection sensitivity (which may, e.g., comprise controlling one or more detection thresholds) of the PIR sensor 200, the pyroelectric sensing elements 410 can effectively be made blind beyond a certain tilt angle of the IR light 440 away from normal. In particular, in some embodiments, a voltage differential threshold may be configured for the PIR sensor 200 such that the pyroelectric sensing elements 410 are effectively unable to detect infrared radiation from one or more of the off-axis lens-lets 220b-g.

Thus, it can be seen how the strength of detection of the primary area 620 relative to that of the secondary areas 630a-h (as shown in FIG. 7) is consistent with the effect of a lens 210 comprising a plurality of lens-lets 220a-g as illustrated in FIG. 8A and FIG. 8B. That is, the central lens-let (which intersects the primary sensing axis) delivers maximum IR energy at an angle of incidence that is closest to normal among the plurality of lens-lets 220 of the lens 210. Accordingly, the primary area 620, which also intersects the primary sensing axis, is the area within the FoV 150 in which detection is strongest.

In addition, the further away an off-axis lens-let is from the primary sensing axis, the more the angle of incidence of infrared radiation from that off-axis lens-let to the pyroelectric sensing elements 410, the more the signal to be detected by the pyroelectric sensing elements 410 is aberrated, and the less IR energy there is to detect, thereby requiring a higher detection sensitivity (e.g., as configured by setting a lower detection threshold) to overcome the effect of the increased angle of incidence. Correspondingly, the secondary areas 630a-h within the FoV 150 are areas within the FoV 150 in which detection is relatively weaker as compared to the primary area 620.

Figure 9B:
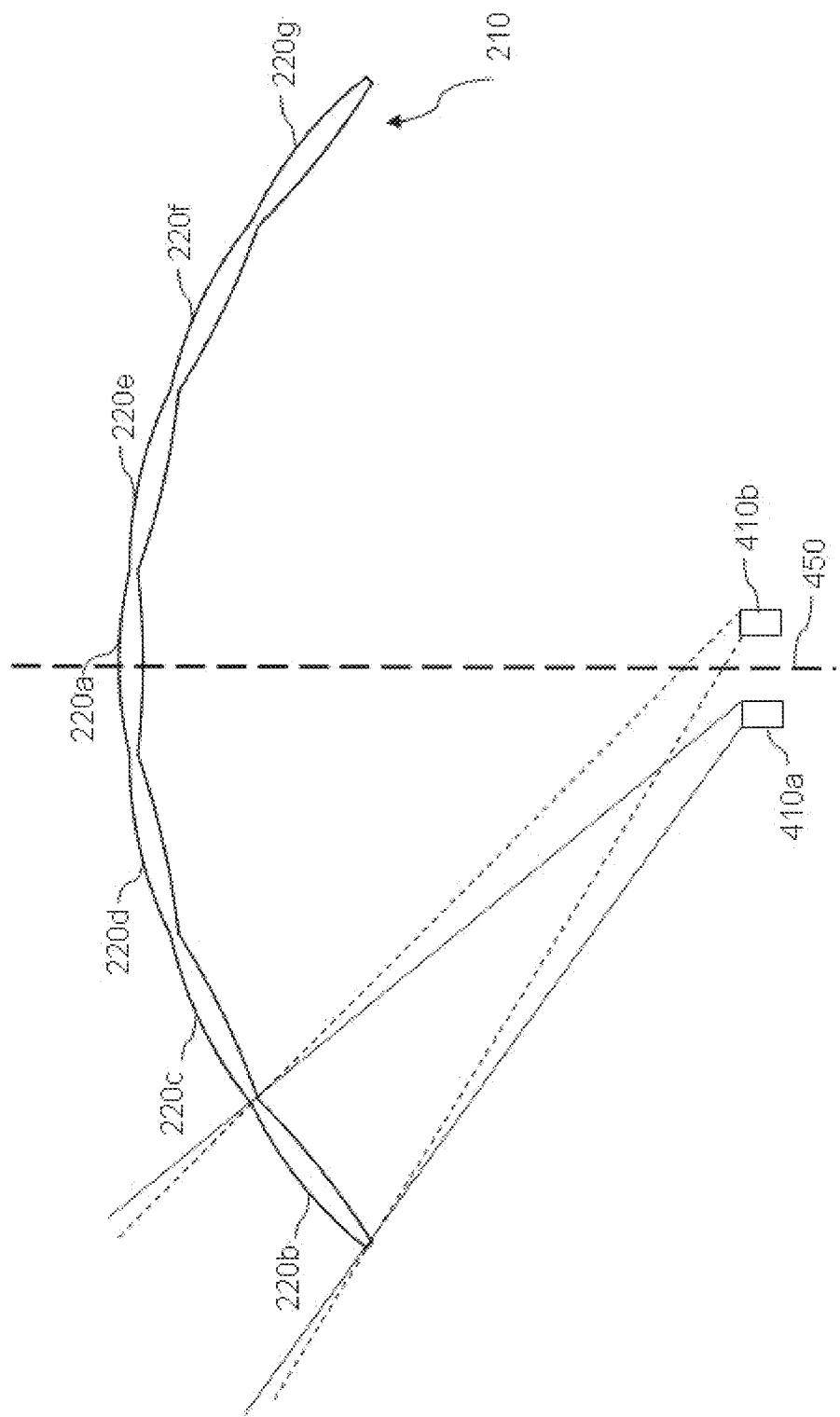

Similar principles apply to lenses 200 having other shapes. FIG. 9A and FIG. 9B illustrate how the off-axis lens-lets 220b-g of a domed lens 210 similarly provides infrared radiation to the pyroelectric sensing elements 410a-b at a higher angle of incidence (see FIG. 9B) as compared to the angle of incidence of infrared radiation received via the central lens-let 220a (see FIG. 9A). Indeed, this effect will be true for a wide variety of lens 210 shapes and PIR sensor 200 designs in which infrared radiation arrives from some portions of the lens 210 at the pyroelectric sensing elements 410 at an angle of incidence that is greater than that of other portions of the lens.

Particular examples of the lens 210 may be relatively more complex than those shown in FIGS. 8A-B and FIGS. 9A-B. Indeed, particular embodiments of the lens 210 may comprise any number of portions, lens-lets 220, ridges, curves, and/or flat surfaces. In particular, the lens 210 may comprise one or more sections, each of which has its own shape.

Moreover, particular embodiments of the lens 210 enable a uniform distribution of detecting zones 600, 610 of the coverage area over a constant FoV 150. In some such examples, the lens comprises a plurality of lens-lets 220 of varying surfaces. These varying surfaces may adjust or control the transfer of IR onto the pyroelectric sensor elements 440 in different ways, and in some such examples, provide a substantially uniform transfer of IR light throughout the FoV. In at least some such examples, the sensor threshold may produce an identical effect on detection sensitivity using some or all the lens-lets 220 which enables the FoV to also be constant.

Figure 10A:
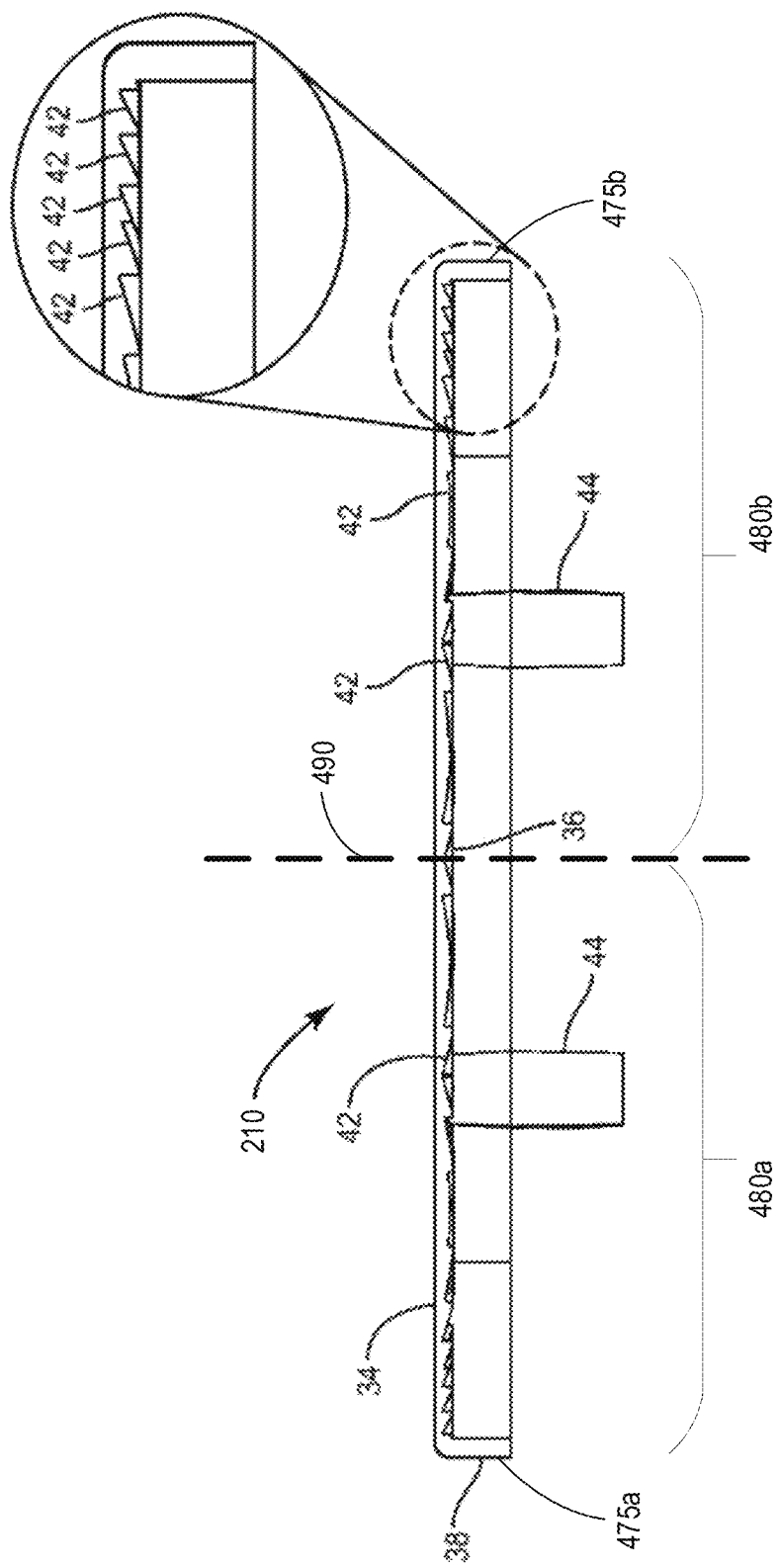
FIG. 10A and FIG. 10B are side and bottom views, respectively, of an example ridged lens, according to one or more embodiments of the present disclosure.
Figure 10B:
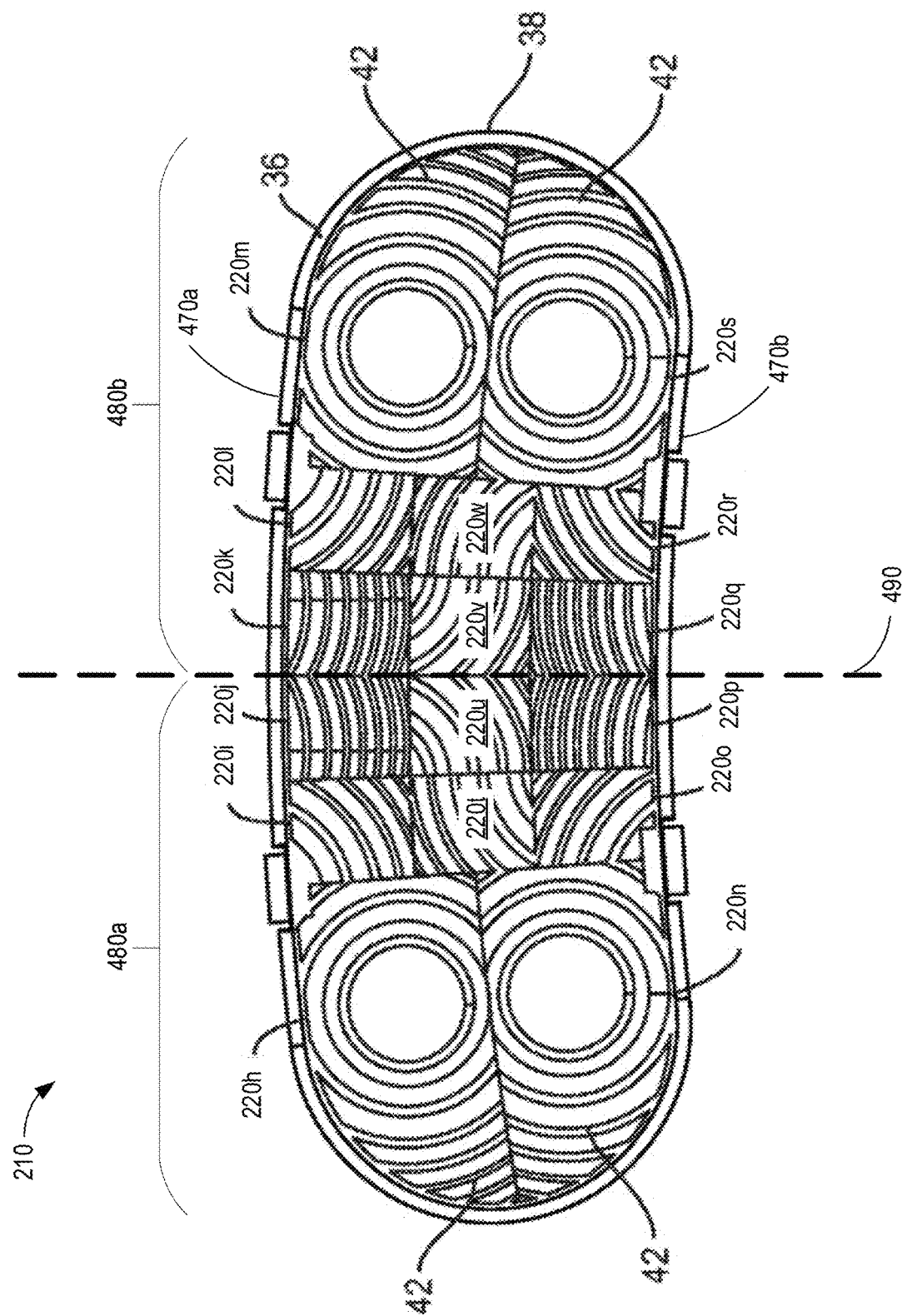
Figure 13A:
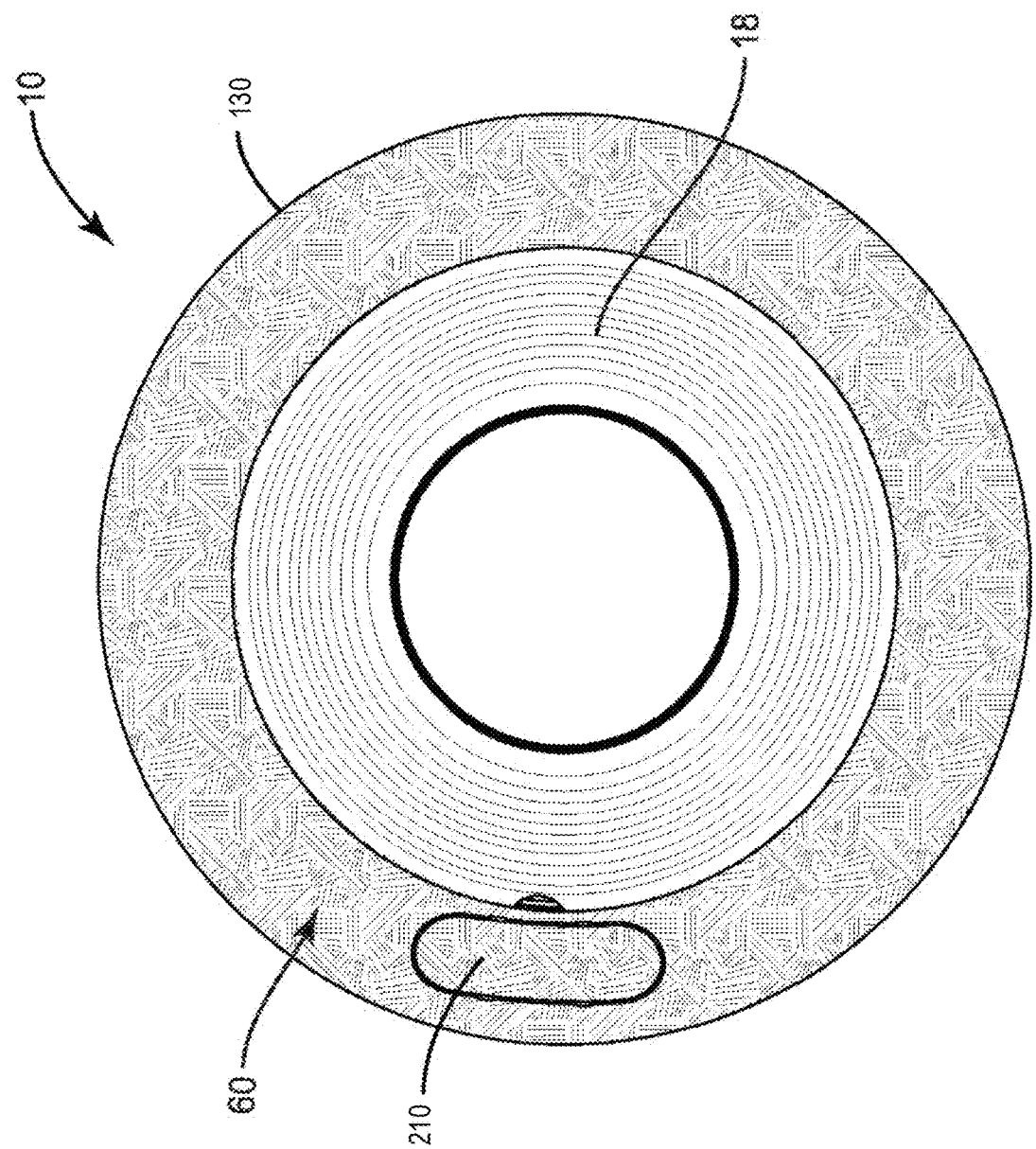
FIG. 13A and FIG. 13B are schematics illustrating top views of lenses that visually blend in with an adjacent surface, according to embodiments of the present disclosure.
Figure 13B:
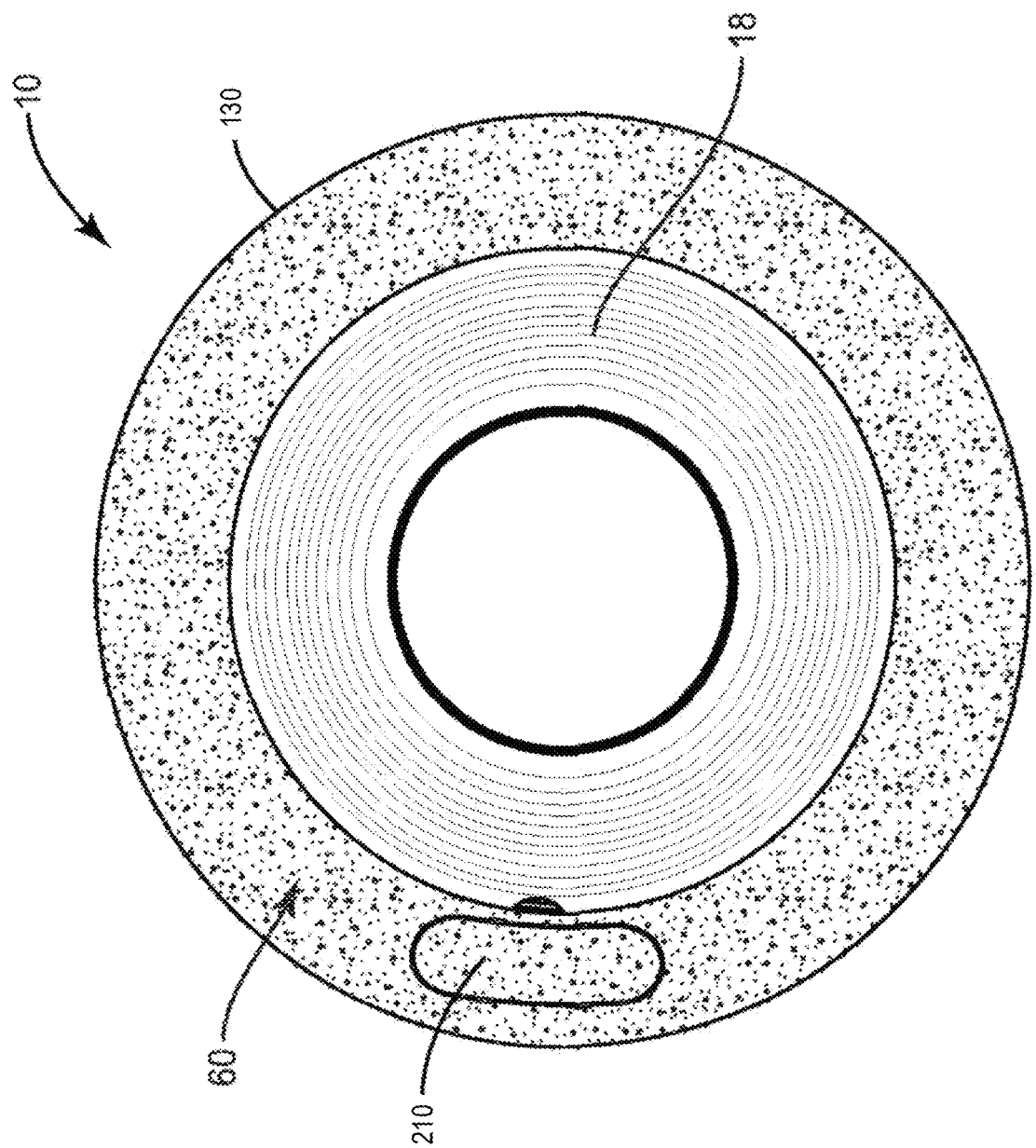

Depicted in FIGS. 10A and 10B is an example of a lens 210 that has a complex shape that, in some embodiments, may be used with one or more PIR sensors 200. The lens 210 comprises a plurality of lens-lets 220h-w (sixteen in this example), each of which forms a Fresnel lens as can be seen from the view of rear surface 36 provided in FIG. 10B. The lens 210 is symmetrical with respect to a plane of symmetry 490 passing through the center, bisecting the lens 210 into a first lateral portion 480a comprising lens-lets 220h-j, 220t-u, and 220n-p, and a second lateral portion 480b comprising lens-lets 220-k-m, 220v-w, and 220q-s. The lens 210 of FIGS. 10A and 10B is asymmetric with respect to all other planes. For example, lens-lets 220i-1 closer to peripheral side 470a of the lens 210 are larger than lens-lens 220o-r closer to opposing peripheral side 470b of the lens 210. Notwithstanding, the individual lens-lets 220h-w contribute to the uniformity of detecting zones 600, 610 within a circular FoV. Such a lens 210 may be installed in one side of a circular housing to match the curve of a fixture, such as shown in FIGS. 13A and 13B.

As can be seen from the side view of FIG. 10A, the lens 210 comprises a substantially flat front surface 34 (i.e., facing away from the pyroelectric sensing elements 410). The lens 210 has raised ridges 42 on a side opposite the front surface 34 (i.e., facing toward the pyroelectric sensing elements 410). The lens-lets 220h, 220n adjacent to peripheral end 475a of lateral portion 480a and the lens-lets 220m, 220s adjacent to peripheral end 475b of lateral portion 480b have larger surface areas relative to the lens-lets 220i-1, 220o-r, and 220t-w that are disposed away from the peripheral ends 475a, 475b (i.e., the more central lens-lets). Lens-lets 220j-k, 220u-v, and 220p-q adjacent to the plane of symmetry 490 (i.e., closest to the center) have relatively smaller surface areas relative to the remaining lens-lets. Thus, each of the lens-lets 220h-w may have a shape that appropriately adjusts the amount of IR light 440 falling onto the pyroelectric sensing elements 410 to provide IR light transfer that is either more uniform over the FoV 150 or variable over the FoV 150 as may be desired. In such embodiments in which a constant FoV is provided, varying the detection threshold may affect detection sensitivity to substantially equivalent degree across the FoV 150.

While Fresnel lenses are often not of sufficient quality for use with imaging optics, they generally provide a large aperture and short focal lengths while remaining relatively compact, and can be very effective for non-imaging optics. Fresnel lenses may have a flat front surface 34, with an opposite light-focusing surface including a number of ridges 42. When such ridges 42 are comprised in a Fresnel lens, they may be referred to specifically as Fresnel ridges. Generally, the ridges 42 are used to focus light incident to a focal point.

FIG. 10A and FIG. 10B show a number of Fresnel ridges 42 in each one of the lens-lets 220h-w. The Fresnel ridges 42 are formed and arranged such that each one of the lens-lets 220h-w is configured to focus light 430, which may be (or include) IR light 440, from a different portion of an area of interest to one or more focal points. Generally, these focal points will correspond with the location of a pyroelectric sensing element 410 in a PIR sensor 200. The Fresnel ridges 42 may each have a different angle, thereby producing a different refraction pattern. The overall refraction from a collection of the Fresnel ridges 42 in each lens-let 220h-w forms a desired aperture and focal length, thereby providing a desirable response.

Given that a lens 210 comprising a plurality of lens-lets 220h-w (such as the example lens 210 illustrated in FIG. 10A and FIG. 10B) may direct light 430 to a relatively large number of different focal points, such a lens 210 may be well suited for use with more than one light sensor (e.g., one or more PIR sensors 200 and/or one or more ambient light sensors). Moreover, the lens 210 may be well suited for receiving light 430 from a relatively large overall FoV 150 of the motion sensing device 100 based on the combined individual FoVs 150 of individual sensors.

The lens 210 may include one or more mounting clips 44, e.g., as shown in FIG. 10A. The mounting clips 44 are configured to interlock with a surface (e.g., a flange) of the motion sensing device 100 (e.g., at the sensor housing 230) in order to secure the lens 210 in place. While the front surface 34 of the lens 210 is discussed and shown being substantially flat, the front surface 34 of the lens 210 may include one or more peripheral ridges, or may be patterned or textured.

Although the lens 210 may be used with any light-based sensor, particular embodiments of the lens 210 discussed herein are particularly useful with PIR sensors 200 intended to detect human occupancy. Accordingly, in some embodiments, the lens 210 may be used with an ambient light sensor and/or a motion sensor. Moreover, the lens 210 may be formed by any suitable material. In one embodiment, the lens 210 is formed from high density poly-propylene (HDPP), high density poly-ethylene (HDPE), Zinc Selenide (ZnSe), Zinc Sulfide (ZnS), or other transparent polymetric materials over IR wavelengths of, e.g., eight to fourteen microns.

In some embodiments of the lens 210, one or more sections of the lens 210 comprise light redirection features (e.g., lens-lets 220, Fresnel ridges 42) whereas others do not comprise light redirection features. The sections lacking light redirection features may be configured to pass light 430 through unfocused, whereas sections 40 that do comprise light redirection features may be configured to focus light as discussed above. In one embodiment, a first sensor (e.g., a PIR sensor 200) is placed behind one or more lens lens-lets 220 comprising light redirection features, while a second sensor (e.g., an ambient light sensor) is placed behind a section that is transparent and does not have light redirection features. The first sensor may, for example, be one that requires access to light information within a relatively large area of interest, while the second sensor may be one that only requires access to light information directly below the lens 210. Dividing the lens 210 into ridged and non-ridged sections, for example, may allow the lens 210 to service multiple sensors while providing a substantially uniform front surface 34, which may improve the aesthetic appeal of the lens 210.

The lens 210 may be manufactured by any number of processes. In one embodiment, the lens 210 is molded via an injection molding process. In another embodiment, the lens 210 is milled out of a piece of material, for example, via a computer numerical control (CNC) router or mill. In yet another embodiment, the lens 210 may be printed via a three-dimensional (3D) printer.

In contrast to the lenses 210 illustrated in FIGS. 8A-B and FIGS. 9A-B (each of which has an outer periphery that is circular in shape, other lenses may have an outer periphery 38 having other shapes. For example, the outer periphery 38 of the lens 210 illustrated in FIG. 10A and FIG. 10B has a relatively complex shape. Other lenses 210 according to other embodiments of the present disclosure may have yet other shapes, and may include one or more sections, and each section may comprise any light redirection feature described herein (e.g., lens-lets 220, ridges 42).

Figure 11B:
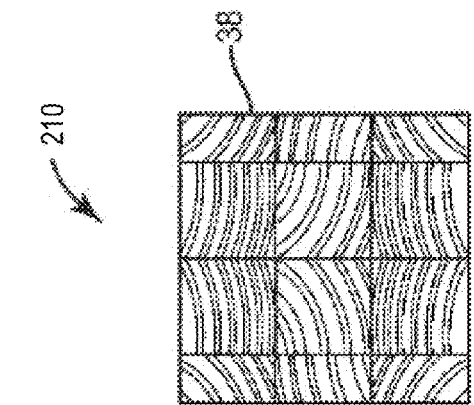
FIG. 11A, FIG. 11B, and FIG. 11C are top views of example lenses having respective peripheral shapes, according to embodiments of the present disclosure.
Figure 11C:
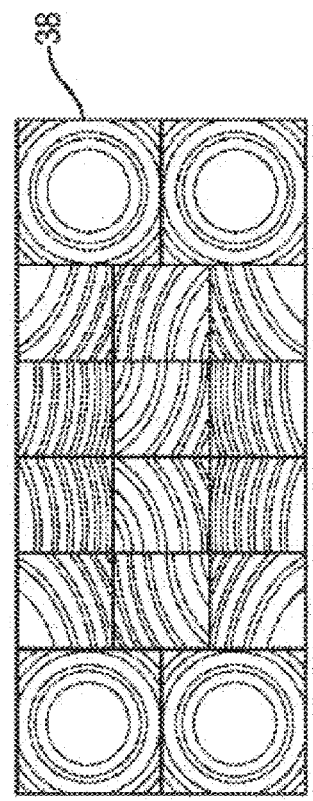
Figure 11A:
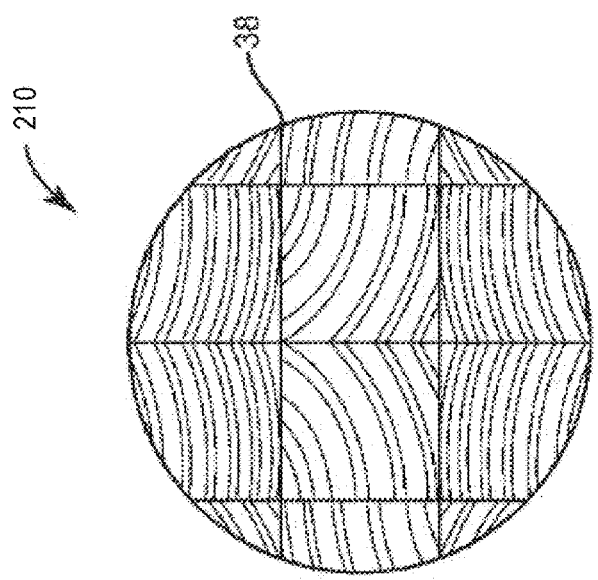

FIG. 11A, FIG. 11B, and FIG. 11C, for example, illustrate top views of lenses 210 comprising an outer periphery having circular, square, and rectangular shape, respectively. Each of the lenses 210 comprises a plurality of sections. In these examples, each of the sections forms a Fresnel lens 42. The particular shape of the outer periphery 38 of the lens 210 may be chosen based on the particular needs of the application for which it is being used. For example, the motion sensing device 100 may be installed in, or integrated into, different types of environments, surfaces, and devices (e.g., lighting fixtures) having different areas, shapes, and visual appearances that lend themselves to using a differently shaped lens 210. In general, it may be advantageous for the lens 210 to be shaped to minimize the visual impact of the lens 210 and therefore blend in with its environment. Despite the different peripheries, the FoV 150 can provide a circular coverage area and zone distributions substantially similar to those of other embodiments. Further, the FoV 150 may be formed in any shape, consistent with aspects described above.

Indeed, visually blending the lens 210 with the its surroundings (e.g., a lighting fixture into which it is integrated) may provide a desirable aesthetic appearance. One way to visually blend the lens 210 with its surroundings is to substantially match the perceived color of the lens 210 to an adjacent surface 130. However, the lens 210 must be colored in such a way as to still remain functional. In particular, the lens 210 must permit energy within a desired wavelength or band of wavelengths to pass through such that the PIR sensor 200 receives energy in a frequency band that it can detect. The lens 210 is transparent typically over IR of eight to fourteen microns despite being opaque over visible wavelengths.

In some embodiments, the surface adjacent to the lens 210 may reflect visible light within a first wavelength or band of wavelengths. For example, if the adjacent surface 130 is that of a lighting fixture, the adjacent surface 130 is likely to be generally opaque. Accordingly, the adjacent surface 130 will generally reflect and/or absorb much of the visible and non-visible light incident thereto. The particular wavelength or wavelengths of visible light reflected by the adjacent surface 130 determines the perceived color of the exterior surface. The lens 210 may be colored in order to reflect a similar wavelength or wavelengths as the exterior surface of the lighting fixture such that the lens 210 appears to be the same or a similar color as the adjacent surface 130. For example, if the adjacent surface 130 is grey, the lens 210 may be colored such that it is similarly grey. Further, the lens 210 may be colored in order to maintain a minimum average transmittance within a desired wavelength or band of wavelengths (e.g., some or all of the infrared spectrum), which are delivered to the PIR sensor 200 in order to provide the functionality thereof. In one embodiment, the desired wavelength or band of wavelengths include visible light between 380 nm and 780 nm. In another embodiment, the desired wavelength or band of wavelengths include infrared energy between 780 nm and 1000 nm. In yet another embodiment, the desired wavelength or band of wavelengths include thermal infrared energy between 1000 nm and 14 µm. Accordingly, the lens 210 may be used with many different sensors 46 such as ambient light sensors and/or PIR sensors 200, among other things.

In some embodiments, the lens 210 is colored via one or more dyes introduced into the material of the lens 210 during manufacturing. In other embodiments, the lens 210 is colored via a film placed over the front surface 34 of the lens 210, for example, the lens 210 may be colored via a multi-layer interference thin-film coating deposited on the front surface 34 of the lens 210. In yet another embodiment, the lens 210 is colored via a paint or dye applied to the front surface 34 of the lens 210. In general, the lens 210 may be colored via any suitable means without departing from the principles of the present disclosure. In certain embodiments, the particular dyes, pigments, paints, or the like may be specifically chosen to reflect certain wavelengths of light while absorbing others to achieve a desired filtration effect for light passing through the lens 210.

Figure 12A:
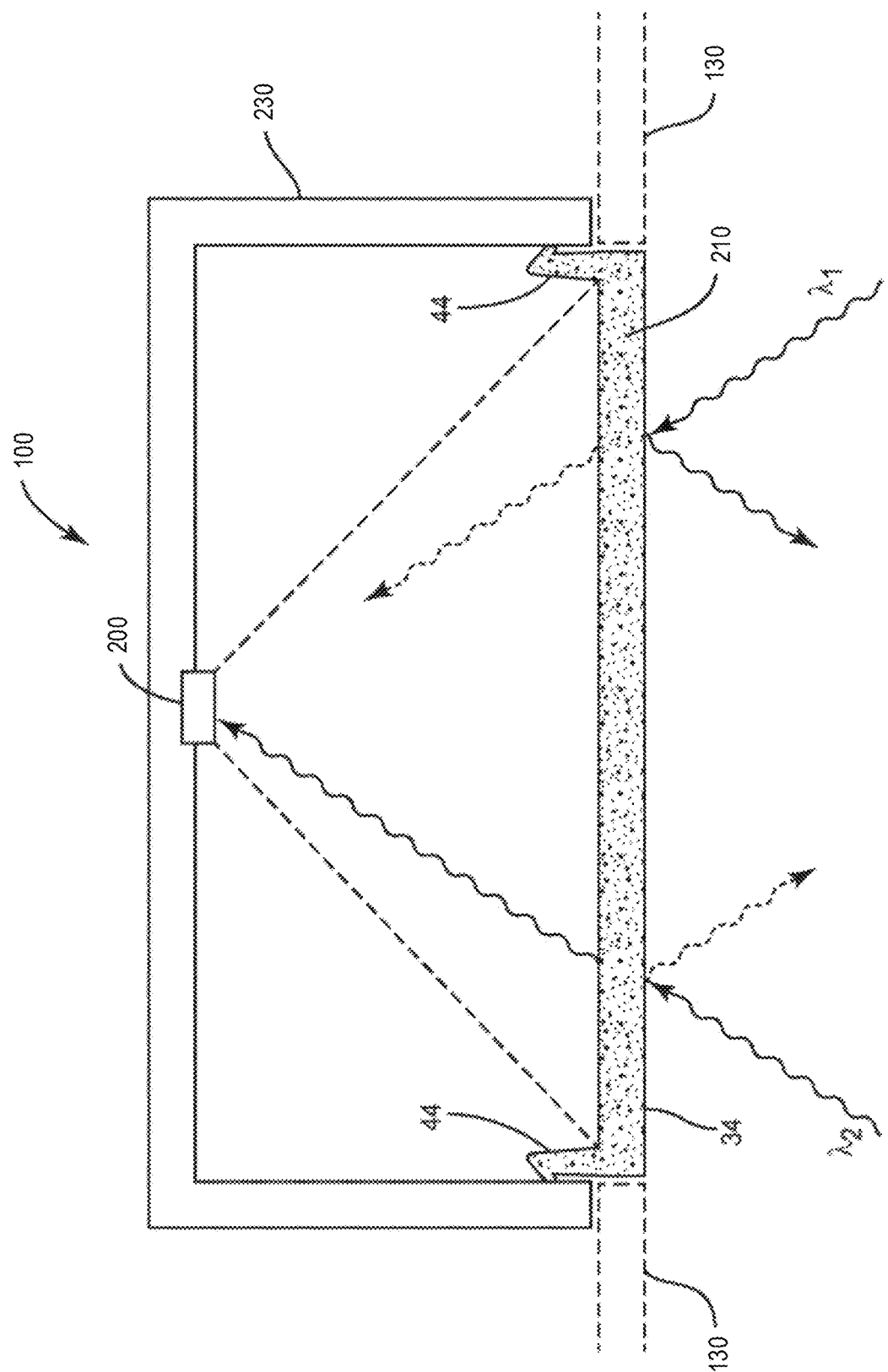
FIG. 12A and FIG. 12B are schematics illustrating side views of example lenses that have been colored and which reflect light of particular wavelengths, according to embodiments of the present disclosure.

In the example of FIG. 12A, operation of a lens 210 comprising coloring as described above is shown. In particular, FIG. 12A illustrates a lens 210 in which dyes or other materials have been added during the manufacturing thereof such that the material of the lens 210 and/or a material placed thereon is configured to reflect visible light within a first wavelength or band of wavelengths $\lambda 1$ while passing light within a second wavelength or band of wavelengths $\lambda 2$. Accordingly, visible light about the first wavelength or band of wavelengths $\lambda 1$ and incident to the front surface 34 of the lens 210 is shown reflecting off the front surface 34. In some cases, only a portion of visible light about the first wavelength or band of wavelengths $\lambda 1$ is reflected by the lens 210. Accordingly, FIG. 12A shows a portion of the incident visible light about the first wavelength or band of wavelengths $\lambda 1$ reflecting off the lens 210. The portions of light about the first wavelength or band of wavelengths $\lambda 1$ reflected from the lens 210 determine the perceived color of the lens 210. Light about the second wavelength or band of wavelengths $\lambda 2$, which may be IR light or non-visible light in various embodiments, is shown passing through the lens 210 and to the PIR sensor 200. In some cases, only a portion of light about the second wavelength or band of wavelengths $\lambda 2$ is passed by the lens 210. Accordingly, FIG. 11A shows a portion of the incident light about the second wavelength or band of wavelengths $\lambda 2$ reflecting off the front surface 34 of the lens 210.

In one embodiment, the first wavelength or band of wavelengths $\lambda 1$ includes visible light between about 380 nm and 780 nm. The second wavelength or band of wavelengths $\lambda 2$ may include visible light between 380 nm and 780 nm, infrared energy between 780 nm and 1000 nm, and thermal infrared energy between 1000 nm and 14 µm. The average transmittance of the lens 210 may be greater than 10% and less than 90%, depending on wavelength. Average transmittance defines how much (on average) radiant energy received by a particular surface is passed through the surface. Accordingly, the average transmittance of the lens 210 determines how much visible light, infrared energy, and/or thermal infrared energy is received by the PIR sensor 200. As discussed above, the PIR sensor 200 must receive a minimum amount of energy in order to remain functional. The particular coloring used for the lens 210 takes this into consideration, striking a balance between matching the hue of the adjacent surface 130 and providing a minimum amount of energy to the PIR sensor 200.

Figure 12B:
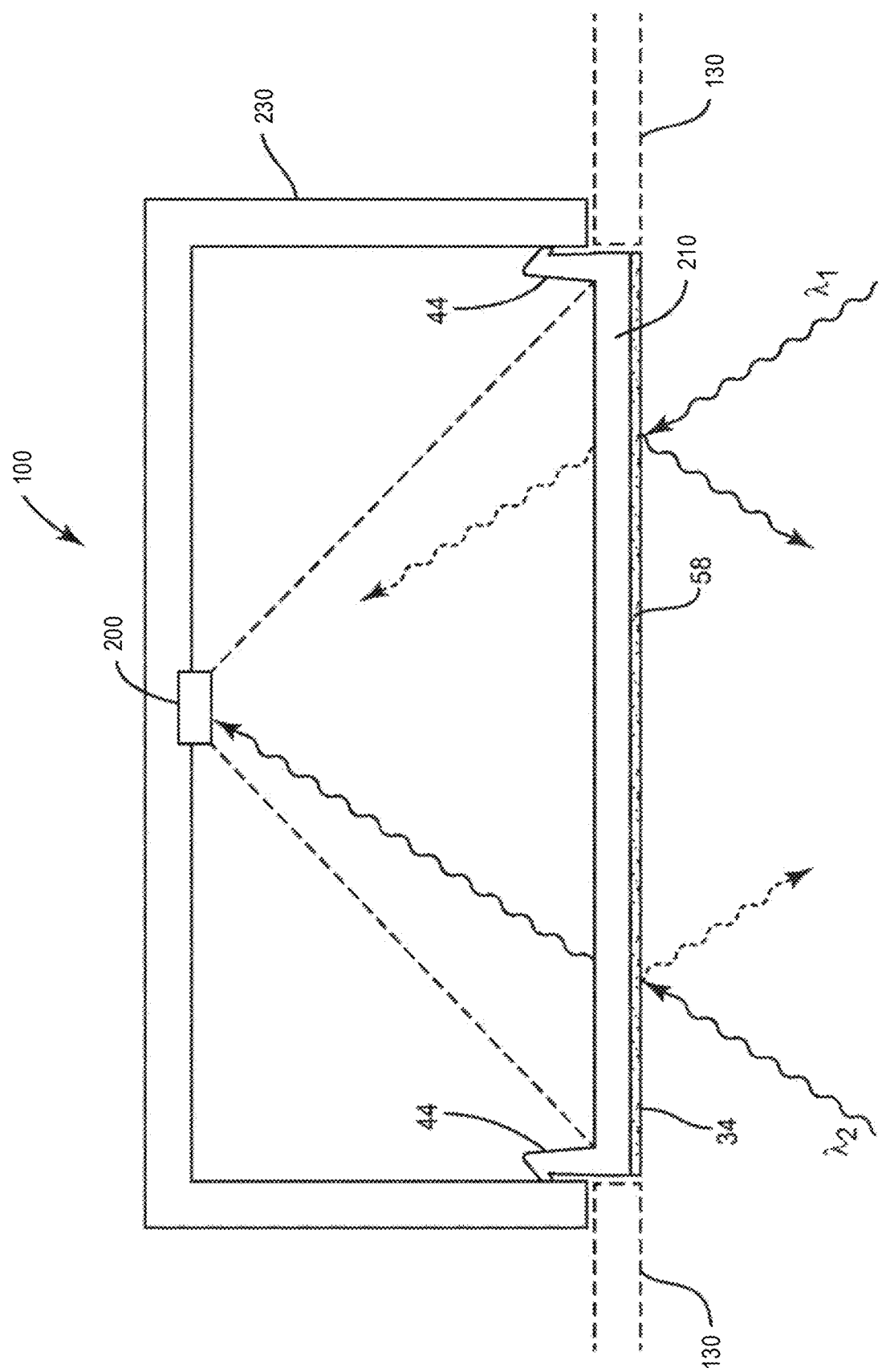

FIG. 12B shows the lens 210 according to other embodiments of the present disclosure. The lens 210 shown in FIG. 12B is substantially similar to that shown in FIG. 12A, except that the coloring of the lens 210 is accomplished via a thin-film layer. The thin-film layer 58 may be a paint or dye that has been applied to the front surface 34 of the lens 210, or may be a separate piece of material that is applied to the front surface 34 of the lens 210, for example, via an adhesive. The lens 210 shown in FIG. 12B behaves similarly to that described above with respect to FIG. 12A, wherein the lens 210 reflects visible light within a first wavelength or band of wavelengths $\lambda 1$ while passing light within a second wavelength or band of wavelengths $\lambda 2$ through the lens 210 and to the PIR sensor 200. In some embodiments, the front surface 34 of the lens 210 may be slightly recessed from the adjacent surface 130 such that even with the thin-film layer 58 applied the lens 210 sits substantially flush with the adjacent surface 130.

Another way to aesthetically blend the appearance of the lens 210 and an adjacent surface 130 is to provide a continuous visual pattern over the adjacent surface 130 and the lens 210. FIG. 13A and FIG. 13B each illustrate a lighting fixture 10 that has a visual pattern 60 over an exterior surface that is adjacent to the front surface 34 of the lens 210. Specifically, FIG. 13A shows the lighting fixture 10 in which a visual pattern 60 of lines is over the exterior surface and the lens 210, whereas FIG. 13B shows the lighting fixture 10 in which a visual pattern 60 of dots or specs resembling those found on the surface of drop-ceiling tiles is over the exterior surface and the lens 210. As described herein, a "continuous" visual pattern is one that is substantially uninterrupted by the border between the exterior surface and the lens 210.

While only two visual patterns 60 are illustrated for reference, any number of different visual patterns 60 may be over the lens 210 and an adjacent surface 130 without departing from the principles of the present disclosure. For example, stripes of any orientation, decorative designs, noise/static, or any other pattern may be over the lens 210 and an adjacent surface 130 without departing from the principles of the present disclosure. The visual pattern 60 of the lens 210 may be chosen based on the type of surrounding in which the lens 210 is installed. For example, the visual pattern 60 may be chosen to match a pattern or texture present on the light fixture, which itself was chosen to match a pattern on a ceiling in which the lighting fixture 10 is installed.

As the size of the motion sensing device 100 and/or the lens 210 decreases, the visual pattern 60 may allow the lens 210 to essentially disappear within the visual pattern 60. For example, a lens 210 having a radius of 5 mm, 3 mm, or even 1 mm may blend completely in with a visual pattern 60 including one or more shapes of about the same size. In other embodiments wherein the lens 210 cannot be made sufficiently small to blend in this way, the continuous nature of the visual pattern 60 between the exterior surface of the adjacent surface 130 and the lens 210 may create a visual appearance of continuity, which allows the lens 210 to aesthetically blend with adjacent surface 130.

The visual pattern 60 may be applied in any suitable manner without departing from the principles of the present disclosure. For example, the visual pattern 60 may be painted on, applied via a decal, etched on, or applied via any other suitable process. In one embodiment, the visual pattern 60 is applied on the front surface 34 of the lens 210. In an additional embodiment, the visual pattern 60 is embedded in the material of the lens 210.

The visual pattern 60 may reduce the overall intensity of the light received by the PIR sensor 200. In this regard a visual pattern 60 that is overly dense and/or opaque will diminish the average transmittance of the lens 210 to the point where the PIR sensor 200 no longer functions properly. Accordingly, embodiments of the present disclosure strike a balance between the density and/or opacity of the visual pattern 60 and a desired intensity of light to be received by the PIR sensor 200, as given by Equation 3 below:

$$(P_{SCP} * T_P) + (P_{SCNP} * T_{SC}) = T_{AVE} \quad (Eq. 3)$$

where $P_{SCP}$ is the percentage of the lens 210 covered by the visual pattern 60, $T_P$ is the average transmittance of the visual pattern 60, $P_{SCNP}$ is the percentage of the lens 210 not covered by the visual pattern 60, $T_{SC}$ is the average transmittance of the lens 210, and $T_{AVE}$ is the overall average transmittance of the lens 210. In some embodiments, the lens 210 is designed such that the overall average transmittance $T_{AVE}$ of the lens 210 is greater than about 10%. Generally, the overall average transmittance $T_{AVE}$ of the lens 210 may be between about 10% and 90% while still providing adequate energy to the PIR sensor 200.

Notably, the continuous pattern may be used along with the coloring described above to achieve further aesthetic blending of the lens 210 with an adjacent surface 130. That is, in addition to providing the lens 210 with coloring such that the perceived color of the lens 210 matches that of an exterior surface of, e.g., a lighting fixture 10, a continuous visual pattern may also be provided on the lens 210 and the adjacent surface 130.

As suggested by the examples of FIG. 13A and FIG. 13B, devices and techniques for motion sensing may be particularly advantageous to supplement the features of lighting devices. Accordingly, particular embodiments of the present disclosure include a motion sensing device 100 in which a lighting fixture 10 is integrated or is in communication. Example methods and structures additional to those explicitly described herein that may enhance the effective integration of the motion sensing device 100 into a light fixture 10 may be found in U.S. Pat. No. 10,234,121 issued Mar. 19, 2019 and U.S. Pat. No. 10,480,996 issued Nov. 19, 2019, the entire disclosure of each of which is hereby incorporated by reference.

Figure 14B:
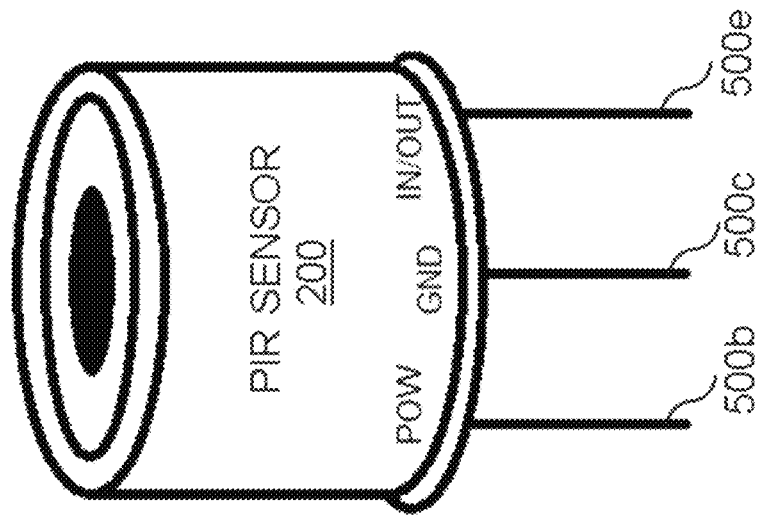
FIG. 14A and FIG. 14B are schematics illustrating example PIR sensors, according to embodiments of the present disclosure.
Figure 14A:
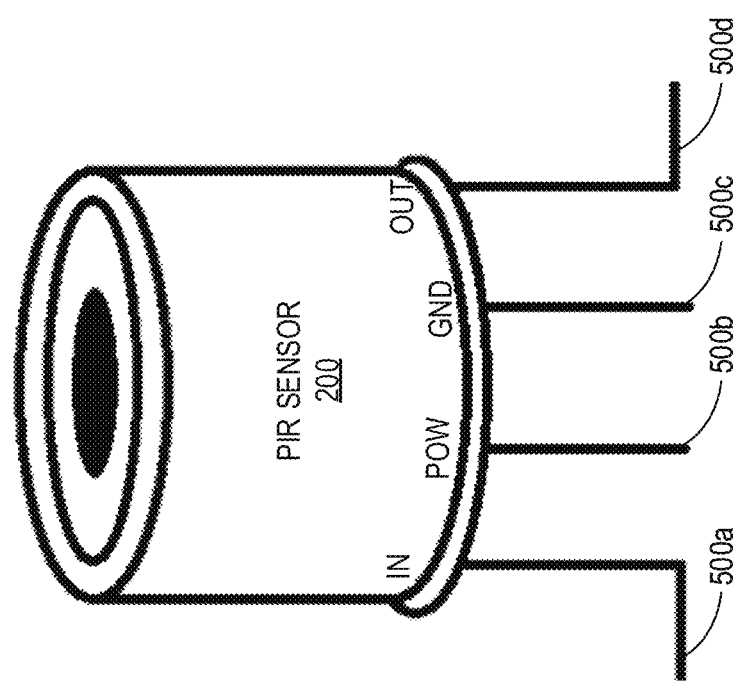

Many of the aspects described above relate to effectively directing infrared radiation from within the FoV 150 to a PIR sensor 200. To adapt the FoV 150 by electrically controlling the PIR sensor 200, the PIR sensor 200 supports an electrical connection to other components within the motion sensing device 100. FIG. 14A and FIG. 14B illustrate examples of the connectors 500 supported by respective PIR sensors 200 according to particular embodiments of the present disclosure. Each of the example PIR sensors 200 illustrated is a digital PIR sensor that comprises respective connections 500b, 500c for power and ground. The PIR sensors 200 of FIG. 14A and FIG. 14B differ, however, in that the PIR sensor 200 of FIG. 14A comprises connections 500a, 500d that are respectively dedicated for control input and output, whereas the PIR sensor 200 of FIG. 14B comprises a connection 500e that supports multiplexed input and output.

The PIR sensor 200 of various embodiments may support a wide variety of control inputs via the control input connection 500a, 500e. Among other things, signaling to configure detection sensitivity, an operation mode of the PIR sensor 200, blind time, filtering (e.g., to designate low-pass filtering or band-pass filtering), and/or window time may be electrically signaled to the PIR sensor 200 via the control input connection 500a, 500e. This signaling may occur at a variety of appropriate times. For example, the detection sensitivity may be adjusted at power up and/or by issuing a special control command, signal, and/or string over the control input connection 500a, 500e as needed.

In particular, the detection sensitivity of the PIR sensor 200 may be electrically controlled using any of a plurality of sensitivity settings, depending on the embodiment. For example, the PIR sensor 200 may support a range of sensitivity settings from a highest sensitivity setting to a lowest sensitivity setting. These values, for example, may correspond to a sensitivity of an Analog-to-Digital Converter (ADC) of the PIR sensor (e.g., to increments of the smallest amount of change to the analog input that will produce a change in digital output from the ADC) and used to specify the threshold amount of differential voltage required to generate an output signal indicating that infrared radiation (or motion) has been detected.

In one such example, the PIR sensor 200 supports a range of sensitivity settings from 1 (i.e., the highest sensitivity) to 255 (i.e., the lowest sensitivity). One or more of these values may be associated with predefined sensitivity levels of the PIR sensor 200. For example, the values 10, 38, and 62 may be designated as high, medium, and low sensitivity, which may (for example) simplify configuration of the PIR sensor 200 by limiting options or guiding users to appropriate settings for particular applications.

In some embodiments, electrical control of the detection sensitivity of the PIR sensor 200 is limited to a subset of the supported sensitivity settings, e.g., to prevent the PIR sensor from being configured with a sensitivity setting that is inappropriate for the application in which it will be used. For example, the motion sensing device 100 may avoid or prevent the PIR sensor 200 from being configured with a sensitivity setting that is too sensitive and/or too insensitive for the operating environment. As one example, the motion sensing device 100 may avoid or prevent configuring the PIR sensor 200 with values less than 10 (i.e., the high setting) and more than 62 (i.e., the low setting). Additional, fewer, and/or different settings, values, and/or ranges may be supported and/or used according to other embodiments.

The effect of particular sensitivity settings on the size of the FoV 150 for one or more mounting distances may be tabulated in advance and stored (e.g., programmed) in a memory of the motion sensing device 100. FIG. 15 is an example table 770 that indicates, for each of a plurality of mounting heights, a diameter 125 of the FoV 150 of the motion sensing device 100 at each of three sensitivity settings (i.e., high, medium, and low). As shown in FIG. 15, increasing and decreasing the mounting distance correspondingly increases and decreases the diameter 125 of the FoV 150, respectively. Additionally, increasing and decreasing the sensitivity at a given mounting distance increases and decreases the diameter 125 of the FoV 150, respectively.

Given a table 770 that maps FoV 150 sizes to sensitivity settings for each of a plurality of distinct mounting distances, the motion sensing device 100 may accept requests to adapt the FoV 150 to a desired FoV, e.g., via a communications network (e.g., via Wi-Fi). Responsive to receiving such a request, the motion sensing device 100 may obtain a sensitivity setting corresponding to the desired field of view from the table 770, and adapt the FoV 150 by electrically controlling the detection sensitivity by applying the sensitivity setting to the detection sensitivity of the PIR sensor 200. In this way, the FoV 150 may be adapted to the desired field of view.

In some embodiments, the motion sensing device 100 may support requests to adapt the FoV 150 to a desired FoV despite that desired FoV being absent from the table 770. In some such embodiments, the motion sensing device 100 may select the sensitivity setting that maps most closely to the desired field of view from the sensitivity settings corresponding to the mounting distance of the motion sensing device 100. Accordingly, the mounting distance of the motion sensing device 100 may be configured and stored in memory, e.g., so that the motion sensing device 100 may select an appropriate sensitivity from the table 770 to fulfill the request. That said, in some embodiments, the mounting height may be included in the request itself.

Moreover, in some embodiments, the motion sensing device 100 may set the detection sensitivity of the PIR sensor 200 to a detection sensitivity that has been preselected, e.g., to establish a default FoV 150 around the primary sensing axis of the motion sensing device 100. For example, the motion sensing device 100 may set the PIR sensor 200 to a high sensitivity upon power up, which may provide the user with a generally useful and responsive product upon initial installation and/or after recovery from a power failure, for example.

Figure 16:
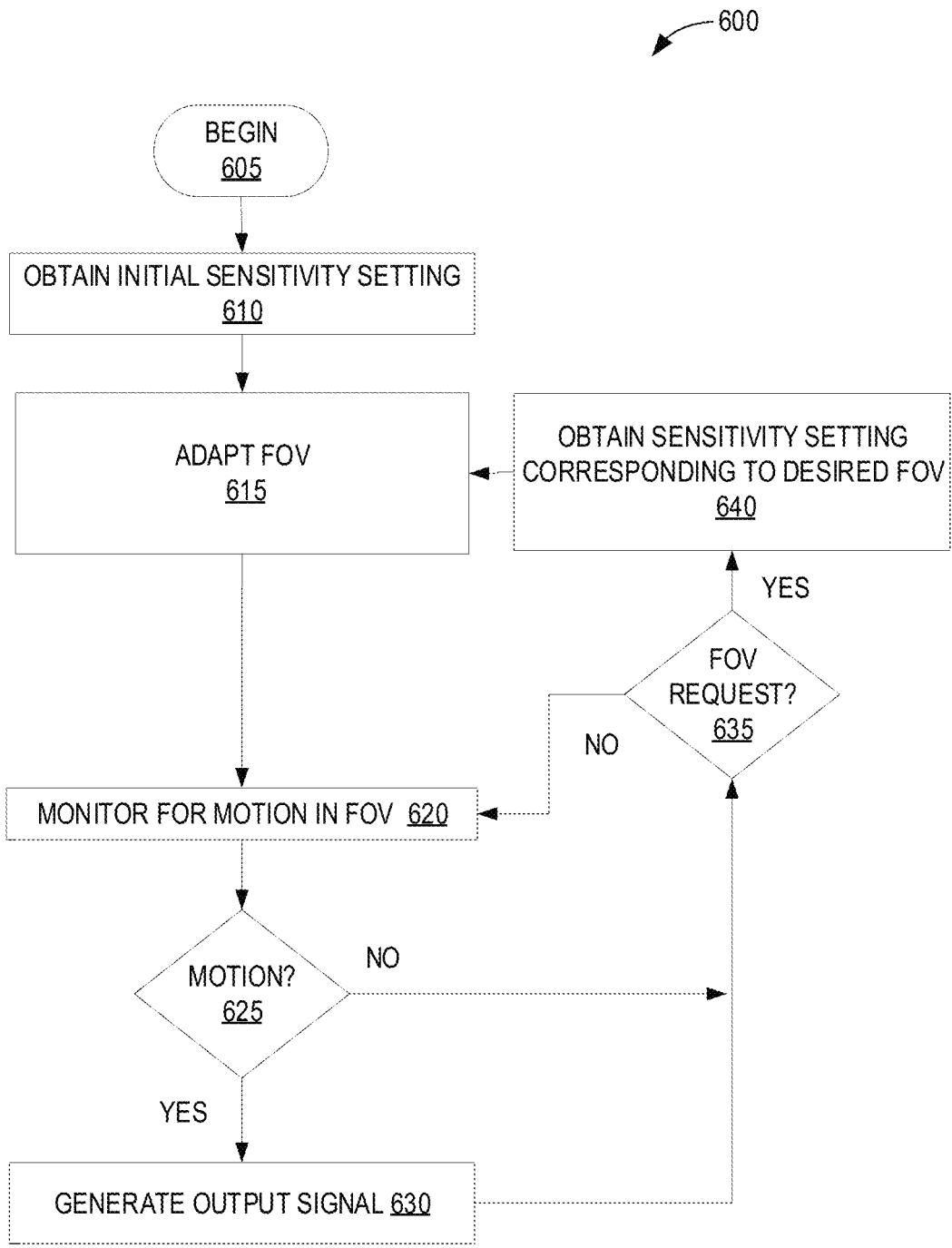
FIG. 16 is a flow diagram illustrating a method of controlling detection sensitivity implemented by a motion sensing device, according to one or more embodiments of the present disclosure.

In view of all of the above, FIG. 16 is a flow diagram illustrating an example method 600 implemented by a motion sensing device 100. The method 600 may begin, e.g., upon startup of the motion sensing device 100 (e.g., in response to receiving power, by receiving an activation signal) (block 605). The method 600 comprises obtaining an initial sensitivity setting (block 610), and adapting a FoV 150 around a primary sensing axis 450 of the motion sensing device 100 by electrically controlling a detection sensitivity of a PIR sensor 200 of the motion sensing device 100 (block 615). In this regard, the initial sensitivity setting may correspond to preselected detection sensitivity, and adapting the FoV 150, in this case, may comprise setting the detection sensitivity of the PIR sensor 200 to the preselected detection sensitivity in order to establish a default FoV 150.

The method 600 further comprises monitoring for motion within the FoV using the PIR sensor 200 (block 620), and if motion is detected within the FoV 150 (block 625, yes path) generating an output signal indicating that the motion is detected (block 630). If the motion is not detected, the output signal is not generated (block 625, no path).

In some embodiments, the PIR sensor 200 comprises at least one pair of pyroelectric sensing elements 410a-b, 410c-d for detecting the motion. Each of the pairs may be configured to generate an amount of differential voltage between its pyroelectric sensing elements based on an amount of exposure to infrared radiation. Accordingly, in some embodiments of the method 600, the output signal of the motion sensing device 100 is controlled based on whether or not any pair of pyroelectric sensing elements generates the differential voltage in excess of the voltage threshold. This voltage threshold may correspond to the detection sensitivity of the PIR sensor 200.

Thus, when the FoV 150 is adapted by electrically controlling the detection sensitivity of the PIR sensor 200, the voltage threshold may, e.g., be configured such that at least one of the pairs of pyroelectric sensing elements 410a-b, 410c-d is configured to generate the differential voltage in excess of the voltage threshold when a given quantum of infrared radiation, external to the motion sensing device 100, is within the FoV 150. Correspondingly, the voltage threshold may be configured such that those pairs do not generate the differential voltage in excess of the voltage threshold when the given quantum of infrared radiation is outside of the FoV 150.

Further, depending on the embodiment, the method may comprise, while monitoring for motion, receiving, at a pair of pyroelectric sensing elements, more or less of the given quantum of infrared radiation based respectively on whether the given quantum of infrared radiation is closer to or more distant from the primary sensing axis. The pyroelectric sensing elements 410 may receive the infrared radiation in this way, e.g., due to its arrangement of components, position, lens shape, and/or other factors. In particular, receiving more or less of the given quantum of infrared radiation may be based respectively on whether an angle of incidence of the given quantum of infrared radiation upon the at least one pyroelectric sensing element is lower or higher.

As an even further example, to generate the amount of differential voltage between its pyroelectric sensing elements 410a-b, 410c-d based on an amount of exposure to infrared radiation, each pair of pyroelectric sensing elements 410a-b, 410c-d may be configured to generate a monotonically decreasing amount of differential voltage as the given quantum of infrared radiation is positioned at increasing distances away from the primary sensing axis. Thus, configuring the voltage threshold such that at least one of the pairs of pyroelectric sensing elements 410a-b, 410c-d is configured to generate the differential voltage in excess of the voltage threshold when the given quantum of infrared radiation is within the FoV 150 and to not generate the differential voltage in excess of the voltage threshold when the given quantum of infrared radiation is outside of the FoV 150 may comprise configuring the voltage threshold such that the monotonically decreasing amount of differential voltage decreases below the voltage threshold at a peripheral end 160 of the FoV 150.

The method 600 further comprises determining whether a request to adapt the FoV 150 to a desired FoV is received via a communication network (block 635). If not (block 635, no path), then in accordance with the method 600, the motion sensing device 100 may continue monitoring for motion in the existing FoV 150 as previously described (block 620). On the other hand, if such a request is received (block 635, yes path), then in accordance with the method 600 and responsive to the request, the motion sensing device 100 obtains a sensitivity setting corresponding to the desired FoV from a table 770 mapping field of view sizes to sensitivity settings (block 640), and again adapts the FoV 150 around the primary sensing axis 450 of the motion sensing device 100 by electrically controlling the detection sensitivity (block 615). This time, adapting the FoV 150 by electrically controlling the detection sensitivity comprises applying the sensitivity setting from the table 770 to the detection sensitivity of the PIR sensor 200 such that the FoV 150 is adapted to the desired FoV. As previously discussed, the table 770 may further map FoV sizes to sensitivity settings for each of a plurality of distinct mounting distances. Accordingly, in some embodiments, obtaining the sensitivity setting corresponding to the desired FoV from the table 770 comprises selecting the sensitivity setting that maps most closely to the desired FoV from a plurality of sensitivity settings corresponding to a mounting distance of the motion sensing device 100.

Figure 17:
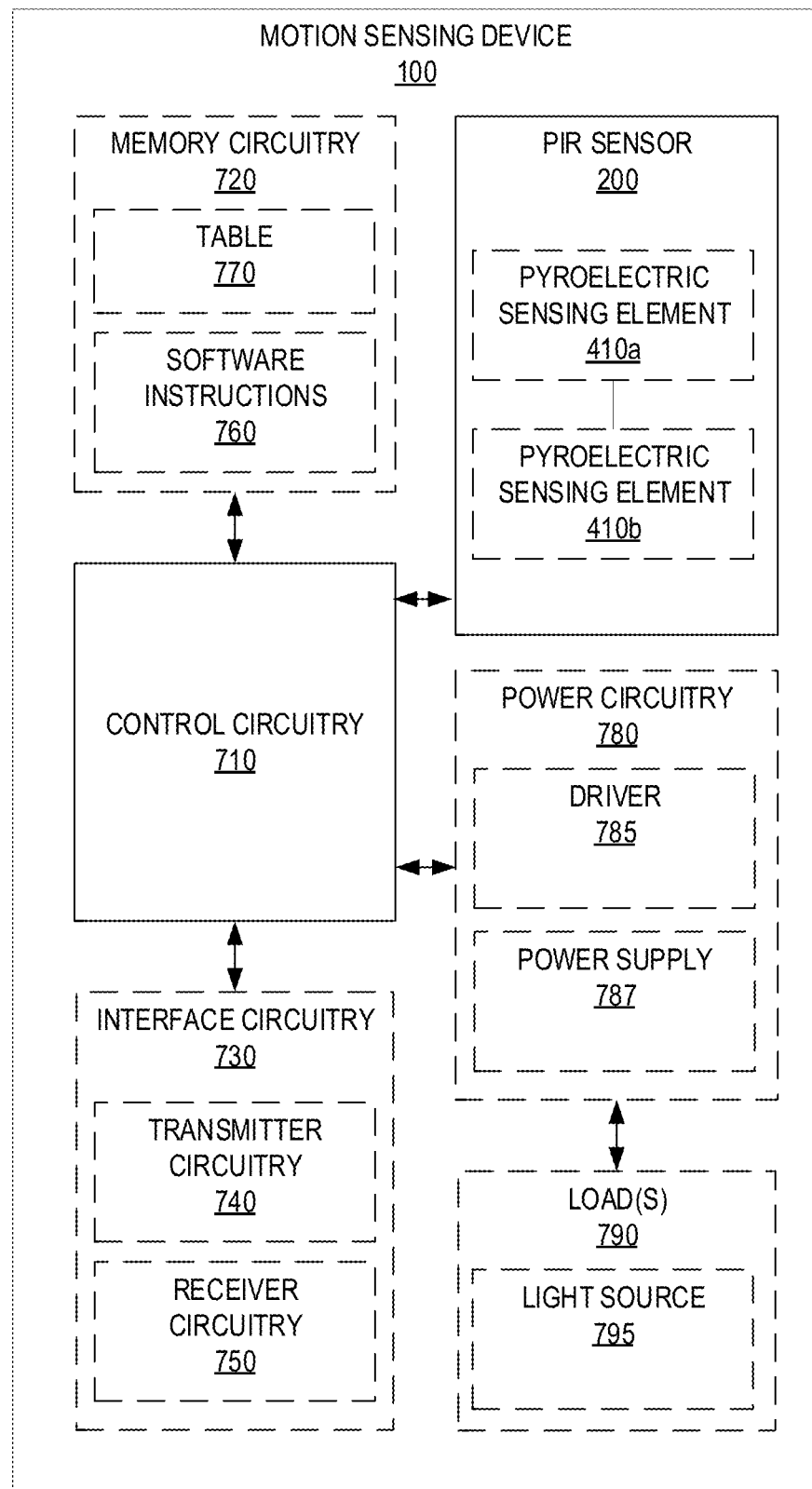
FIG. 17 is a schematic block diagram illustrating electrical components of an example motion sensing device, according to one or more embodiments of the present disclosure.

FIG. 17 schematically illustrates an example motion sensing device 100 comprising certain electrical components, according to particular embodiments of the present disclosure. For clarity of explanation, FIG. 17 omits the mechanical features of the motion sensing device 100 previously discussed to more closely focus on computational aspects. Notwithstanding, it should be understood that the motion sensing device 100 of FIG. 17 may further comprise any of the hardware aspects discussed above.

The motion sensing device 100 comprises a PIR sensor 200 and control circuitry that is communicatively coupled to the PIR sensor 200. The control circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the control circuitry 710 may comprise programmable hardware capable of executing software instructions 760 stored, e.g., as a machine-readable computer program in memory circuitry 720 that is communicatively coupled to the control circuitry 710.

The memory circuitry 720 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., microSD card), and/or hard disk drive.

The control circuitry 710 is configured to adapt an FoV 150 around a primary sensing axis 450 of the motion sensing device 100 by electrically controlling a detection sensitivity of the PIR sensor 200. The control circuitry 710 is further configured to, responsive to adapting the FoV 150, monitor for motion within the FoV 150 using the PIR sensor 200.

In some embodiments, the motion sensing device 100 further comprises interface circuitry 730 communicatively coupled to the control circuitry 710. The interface circuitry 730 may be a controller hub configured to control the input and output (I/O) data paths of the motion sensing device 100. Such I/O data paths may include data paths for exchanging signals over a communications network and/or data paths for exchanging signals with a user. For example, the interface circuitry 730 may comprise a transceiver configured to send and receive communication signals over Wi-Fi, Ethernet, Bluetooth®, NFC, a serial bus (e.g., a 2-wire bus supporting DALI), and/or an optical network.

The interface circuitry 730 may be implemented as a unitary physical component, or as a plurality of physical components that are contiguously or separately arranged, any of which may be communicatively coupled to any other, or may communicate with any other via the control circuitry 710. For example, the interface circuitry 730 may comprise output circuitry 740 (e.g., transmitter circuitry configured to send communication signals over a communications network 105) and input circuitry 750 (e.g., receiver circuitry configured to receive communication signals over a communications network).

According to some embodiments, the memory circuitry is configured to store a table 770 mapping FoV sizes to sensitivity settings, and the interface circuitry 730 is configured to receive, via a communication network, a request to adapt the FoV 150 to a desired FoV. The control circuitry 710 is configured to, responsive to the request, obtain a sensitivity setting corresponding to the desired FoV from the table 770, and apply that sensitivity setting to the detection sensitivity of the PIR sensor 200 such that the FoV 150 is adapted to the desired FoV.

The PIR sensor 200 is configured to accept input from, and provide output to, the control circuitry 710. In some embodiments, the PIR sensor 200 comprises at least one pair of pyroelectric sensing elements 410a-b, each pair being configured to generate an amount of differential voltage between its pyroelectric sensing elements 410 based on an amount of exposure to infrared radiation. In such embodiments, the control circuitry may be further configured to control an output signal of the motion sensing device 100 based on whether or not any pair of pyroelectric sensing elements 410 generates the differential voltage in excess of a voltage threshold corresponding to the detection sensitivity. In some embodiments, the PIR sensor 200 may be digital and comprise one or more connectors 500a, 500d, 500e by which the PIR sensor 200 is communicatively coupled to the control circuitry 710.

In some embodiments, the motion sensing device 100 further comprises power circuitry 780, which is communicatively coupled to the control circuitry 710. The power circuitry 780 is configured to regulate power to one or more loads 790 and/or one or more of the components of the motion sensing device 100 illustrated in FIG. 17, e.g., based on control signaling from the control circuitry 710. In some embodiments, the motion sensing device 100 further comprises at least one the loads 790. Additionally or alternatively, one or more of the loads 790 may be external to the motion sensing device 100, and coupled to the power circuitry 780 via one or more lines, wires, cables, and/or connectors. According to particular embodiments of the present disclosure, one or more of the loads 790 comprises a light source 795, such as a lighting fixture 10.

To regulate power, some embodiments of the power circuitry 780 comprise a driver 785 and/or a power supply 787. For example, to regulate power, a driver 785 of the power circuitry 780 may be configured to drive constant current. Additionally or alternatively, to regulate power, a power supply 787 may be configured to supply a constant voltage. Particular embodiments comprise a driver 785 and a power supply 787 to regulate power to respective loads 790 and/or components of the motion sensing device 100.

In one particular example, the driver 785 may be a Light Emitting Diode (LED) driver, and the load 790 may comprise a light source 795 that comprises one or more LEDs. In this regard, the LED driver may have outputs matched to the electrical characteristics of the LED(s) in order to provide constant current while compensating for changes in forward voltage.

Figure 18:
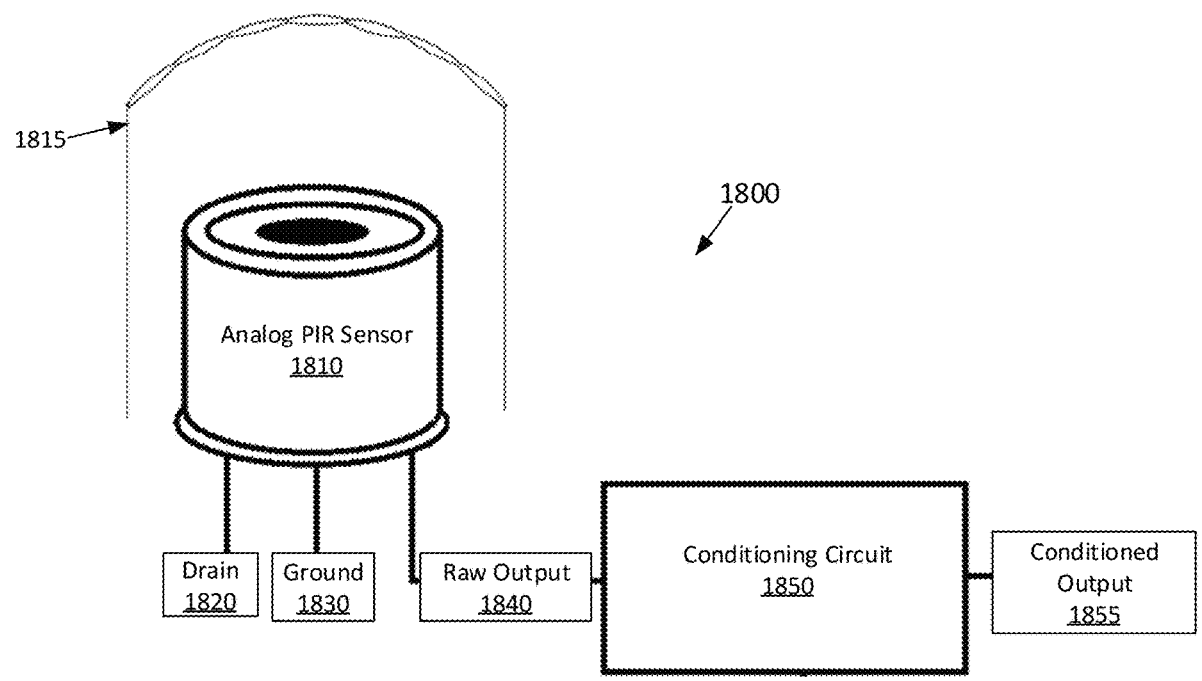
FIG. 18 is a schematic block diagram of an example motion sensing device that includes an analog passive infrared sensor, according to one or more embodiments of the present disclosure.

FIG. 18 is a diagram of an example motion sensing device 1800 that includes an analog PIR sensor 1810 that may include a lens 1815 and may have three terminals: drain 1820, ground 1830, and raw output 1840. The raw output 1840 may be an analog signal received by a conditioning circuit 1850 to generate a conditioned output 1855. The conditioning circuit 1850 may include one or more filters, amplifiers, and/or comparators that are configured to transform the raw output 1840. In some embodiments, the conditioning circuit 1850 may include one or more components for field of view and sensitivity control.

The analog PIR sensor 1810 may lack embedded intelligence that is typical of digital PIR sensors. With such an analog PIR sensor, FoV adjustment may be accomplished by circuitry external to the sensor 1810. In some embodiments, sensitivity control may be provided by components in the conditioning circuit 1850 and/or by other external circuitry.

Similar sensing methods may be employed by or with both the analog PIR sensor 1810 and the digital PIR sensors described herein. For example, as described above with reference to FIG. 6, a motion sensing device utilizing an analog sensor may similarly detect motion by comparing a voltage of an output signal (e.g., conditioned output 1855) to a threshold voltage. The output signal may be produced by the analog PIR sensor in response to infrared radiation received from a heat source moving within an FoV of the motion sensing device.

Figure 19:
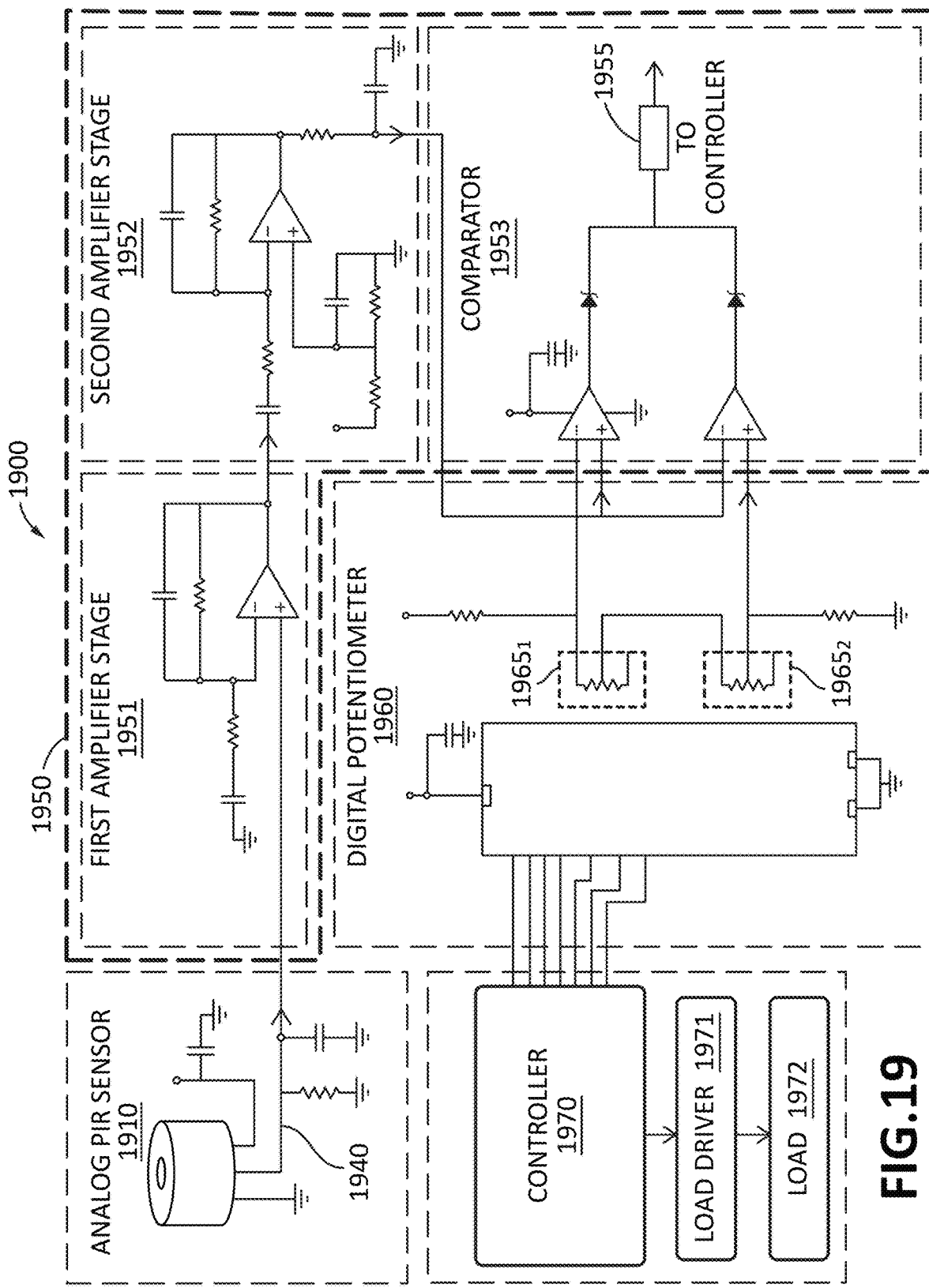
FIG. 19 is a circuit diagram of an embodiment of a motion sensing device in which sensitivity control may be provided by additional components included in a digital potentiometer in communication with a conditioning circuit, according to one or more embodiments of the present disclosure.

FIG. 19 is a circuit and block diagram of an example motion sensing device 1900 that includes electrical sensitivity control for an analog PIR sensor 1910. The device 1900 may include a digital potentiometer 1960 in communication with a conditioning circuit 1950. The analog PIR sensor 1910 may generate a raw output 1940 that may be received by the conditioning circuit 1950. The conditioning circuit 1950 may include a first amplifier and filter stage 1951, a second amplifier and filter stage 1952, and a comparator 1953. First and second amplifier stages 1951, 1952 may include non-inverting or inverting amplifiers, in some embodiments. Components R17 and C16 and R19 and C19 may act as filters for the first amplifier and filter stage 1951. Resistors R17 and R19, along with op-amp U11C, may define the gain or amplification of the first amplifier stage 1951. The second amplifier stage 1952 may similarly alter the output 1940, with components R18 and C17 acting as one filter, R20 and C20 acting as another filter, and amplifier stage gain being defined by R18 and R20 with op-amp U11D. The second amplifier stage 1952 may be used for AC amplification, and may apply a greater amplification to the output 1940 relative to the first amplifier stage 1951. An output of the second amplifier stage 1952 may be received by and input to the comparator 1953, which may compare the received filtered and amplified output 1940 to one or more reference voltages. The reference voltages may be set by a resistor divider network, which uses multiple resistors to divide an applied voltage $V_{DD}$ into multiple reference voltages. The output of this comparison (e.g., conditioned output 1955) may be received by a controller 1970 to detect motion, which, in turn, selectively activates a load 1972 (e.g., light, indicator, lock, etc.) via a load driver 1971.

The resistor divider network may include one or more programmable resistors $1965_1$, $1965_2$ (which may be referred to individually as a programmable resistor 1965 or collectively as the programmable resistors 1965) that may provide a desired resistance responsive to electronic commands. The programmable resistors 1965 may be a part of or otherwise controlled by (e.g., have their resistances controlled by) the digital potentiometer 1960. The digital potentiometer 1960 may receive a user command (e.g., directly or through the controller 1970) and, in response, set the resistances of one or both of the programmable resistors to set the upper and/or lower thresholds applied by the comparator 1953. By either increasing (or decreasing) the resistance of the programmable resistors 1965, the threshold voltage to which the raw output 1940 may be compared may be increased (or decreased). Because motion closer to a primary sensing axis of a sensor's FoV produces a higher voltage than motion farther from the primary sensing axis, increasing (or decreasing) the threshold voltage excludes (or includes) detected motion farther from the primary sensing axis, thereby reducing (or increasing) the effective FoV of the motion sensing device.

The digital potentiometer 1960 may include a single limb, two limbs, or multi-limb potentiometer, and may be in communication with the controller 1970. The controller 1970 may receive and determine motion based on the conditioned output 1955, as noted above, and may also provide input commands to the digital potentiometer 1960 to control one or more comparison thresholds to set the sensitivity of the device 1900. For example, the potentiometer may receive, from the controller 1970, data indicative of a desired resistance value for the programmable resistor(s), of a threshold voltage for the comparator that may be used to derive a resistance value, and/or of a desired FoV that may be used to derive a threshold voltage. These data may be received by the controller 1970 from a user. In response, the digital potentiometer 1960 may alter or otherwise adjust the resistance value(s) of the programmable resistor(s) 1965 based on the received data. As shown in FIG. 19, the digital potentiometer 1960 may include two programmable resistors 1965, labelled as $1965_1$, $1965_2$, as part of the resistor divider network that also includes resistors R24 & R25.

Figure 20:
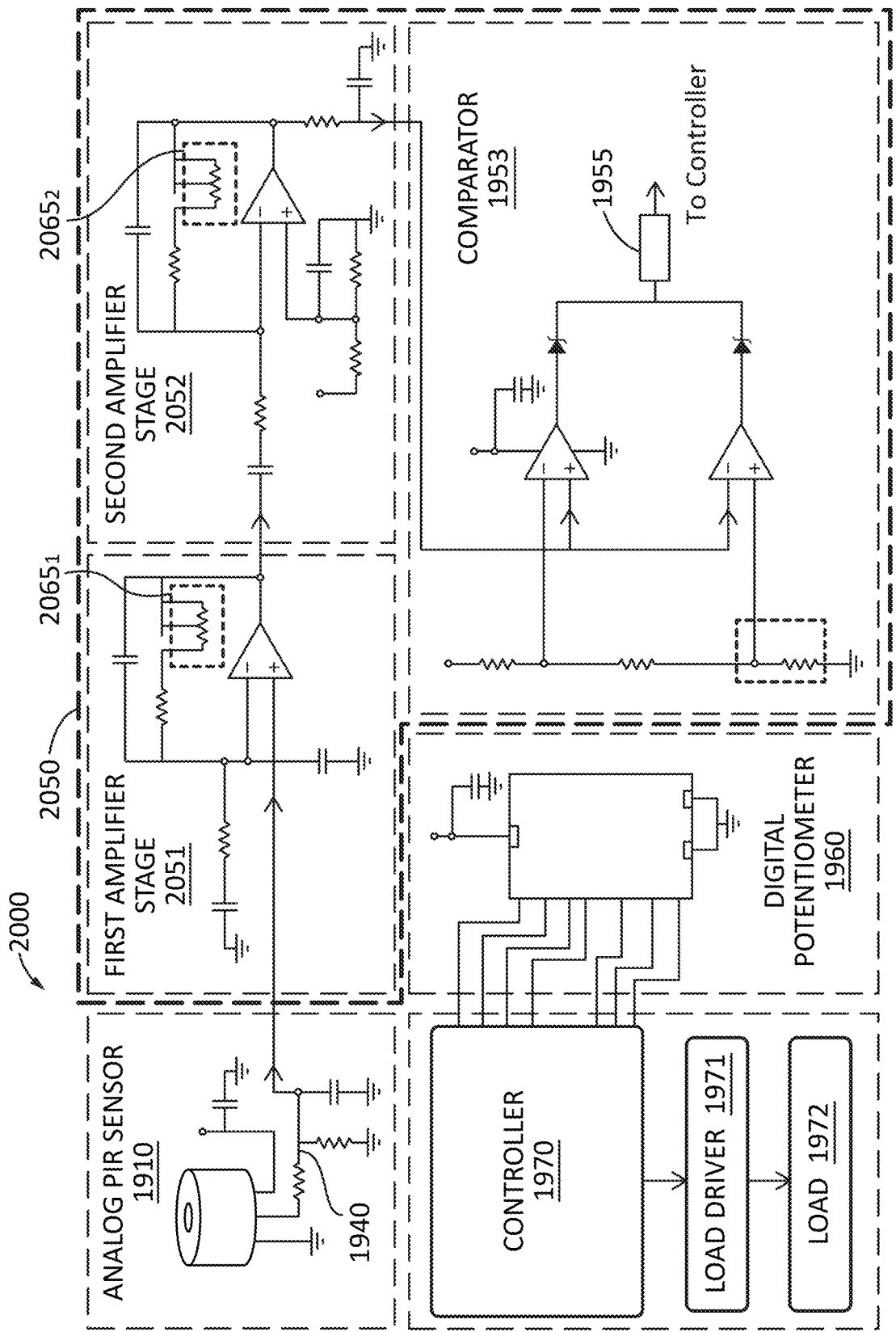
FIG. 20 is a circuit diagram of an embodiment of a motion sensing device in which sensitivity control may be provided by additional components included in a conditioning circuit, according to one or more embodiments of the present disclosure.

FIG. 20 is a circuit diagram of an example motion sensing device 2000 that includes a signal conditioning circuit 2050. The conditioning circuit 2050 may be similar to the conditioning circuit 1850 except as described differently herein. In particular, amplifier and filtering stages 2051, 2052 may include one or more programmable resistors 2065 that may be included in or may be in communication with a digital potentiometer 1960 and may each have an adjustable resistance value. In turn, the digital potentiometer may be in communication with the controller 1970.

The digital potentiometer 1960 may include a single limb, two-limb, or multi-limb potentiometer, and may be in communication with the controller 1970. The controller 1970 may receive and determine motion based on the conditioned output 1955, as noted above, and may also provide input commands to the digital potentiometer 1960 to control one or more resistance values to set the sensitivity of the device 1900. For example, the potentiometer may receive, from the controller 1970, data indicative of a desired resistance value for the programmable resistor(s), of a desired amount of filter gain for each of the amplifier and filtering stages 2051, 2052 that may be used to derive a resistance value, and/or of a desired FoV that may be used to derive a desired amount of gain. These data may be received by the controller 1970 from a user. The digital potentiometer 1960 may alter or otherwise adjust the resistance value(s) of the programmable resistor(s) 2065 based on the received data.

The programmable resistors 2065 may enable the gain and/or amplification applied to the raw output signal 1940 to be changed. As discussed above, when the sensor 1910 detects motion, the voltage output as part of the raw output signal 1940 may be directly correlated to the proximity of the detected motion to a primary sensing axis of the sensor 1910. By increasing (or decreasing) the gain of the amplifier(s) that receive the raw output signal 1940 (e.g., by altering the resistance(s) of the programmable resistors 2065), the scale of the amplitude of the input signal to the comparator 1953 may be set, and the sensitivity and effective FoV of the sensor may correspondingly be set. For example, by increasing the gain of one or both amplifier stages 2051, 2052, the changes to the raw output signal 1940 may correspondingly be greater, and the sensitivity of the device 2000 may be increased.

Figure 21:
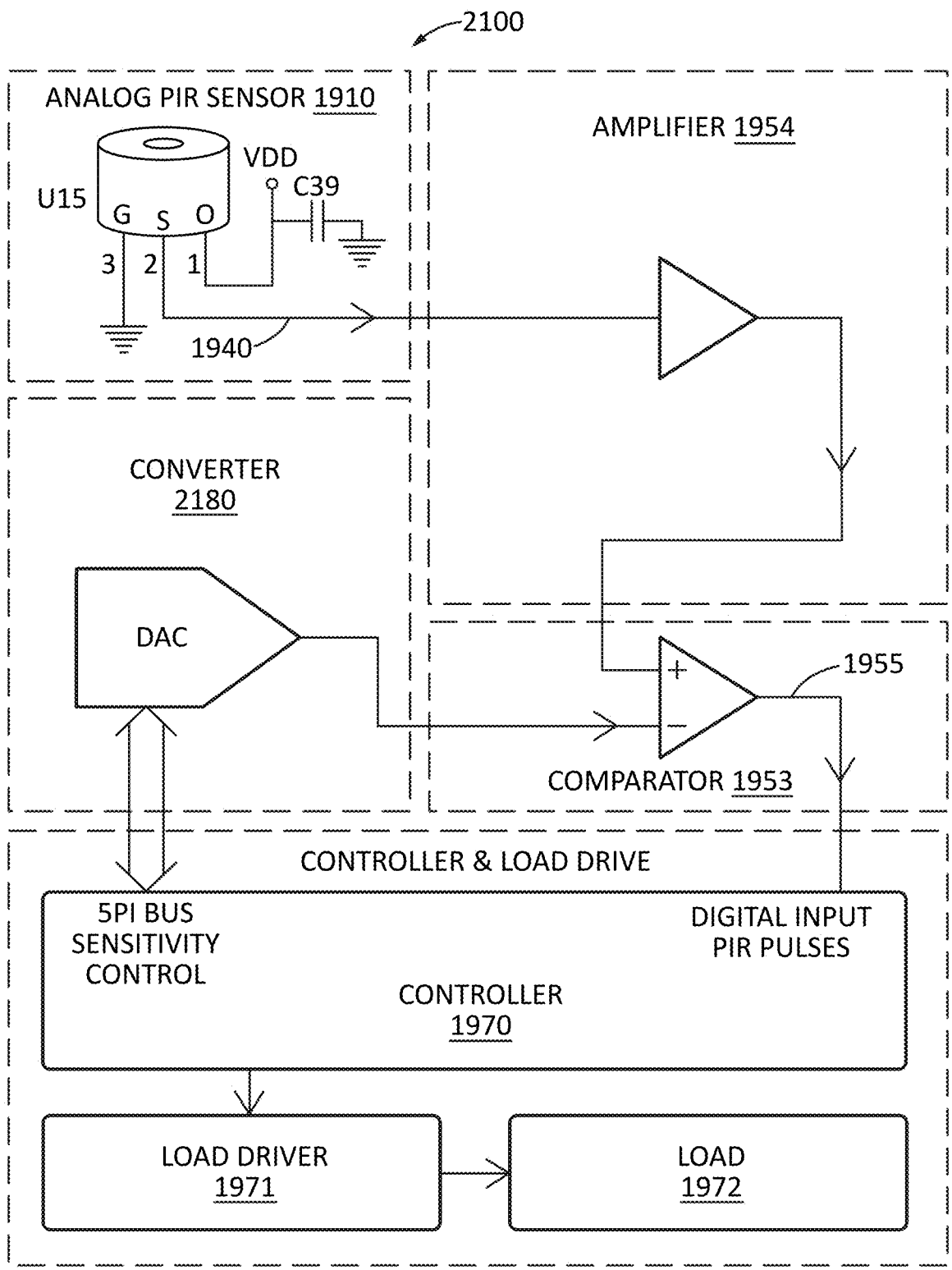
FIG. 21 is a circuit diagram of an embodiment of a motion sensing device in which a converter may be configured to set a threshold for the comparator based on a signal received from a controller, according to one or more embodiments of the present disclosure.

FIG. 21 is a circuit diagram of a motion sensing device 2100 that includes a converter 2180 that may provide a threshold voltage for the comparator 1953 based on a signal received from a controller 1970. The converter 2180 may be a digital-to-analog converter (DAC), such that the signal received from the controller 1970 may be a digital signal, and the signal output by the converter 2180 and received by the comparator 1953 may be an analog signal. The digital signal from the controller 1970 may be or may include data indicative of a threshold voltage for the comparator and/or of a desired sensitivity or FoV that may be used to derive a threshold voltage. The converter 2180 converts this signal to an analog signal that may be input to the comparator 1953 as a threshold against which the output signal 1940 from the analog PIR sensor 1910 (following amplification by the amplifier 1954) may be compared. The output 1955 of this comparison may be output to the controller 1970, which may be configured to analyze the output to determine if motion is detected. As discussed above with relation to FIG. 19, by altering the comparator 1953 threshold, the effective FoV of the motion sensing device 2100 can be controlled.

Figure 22:
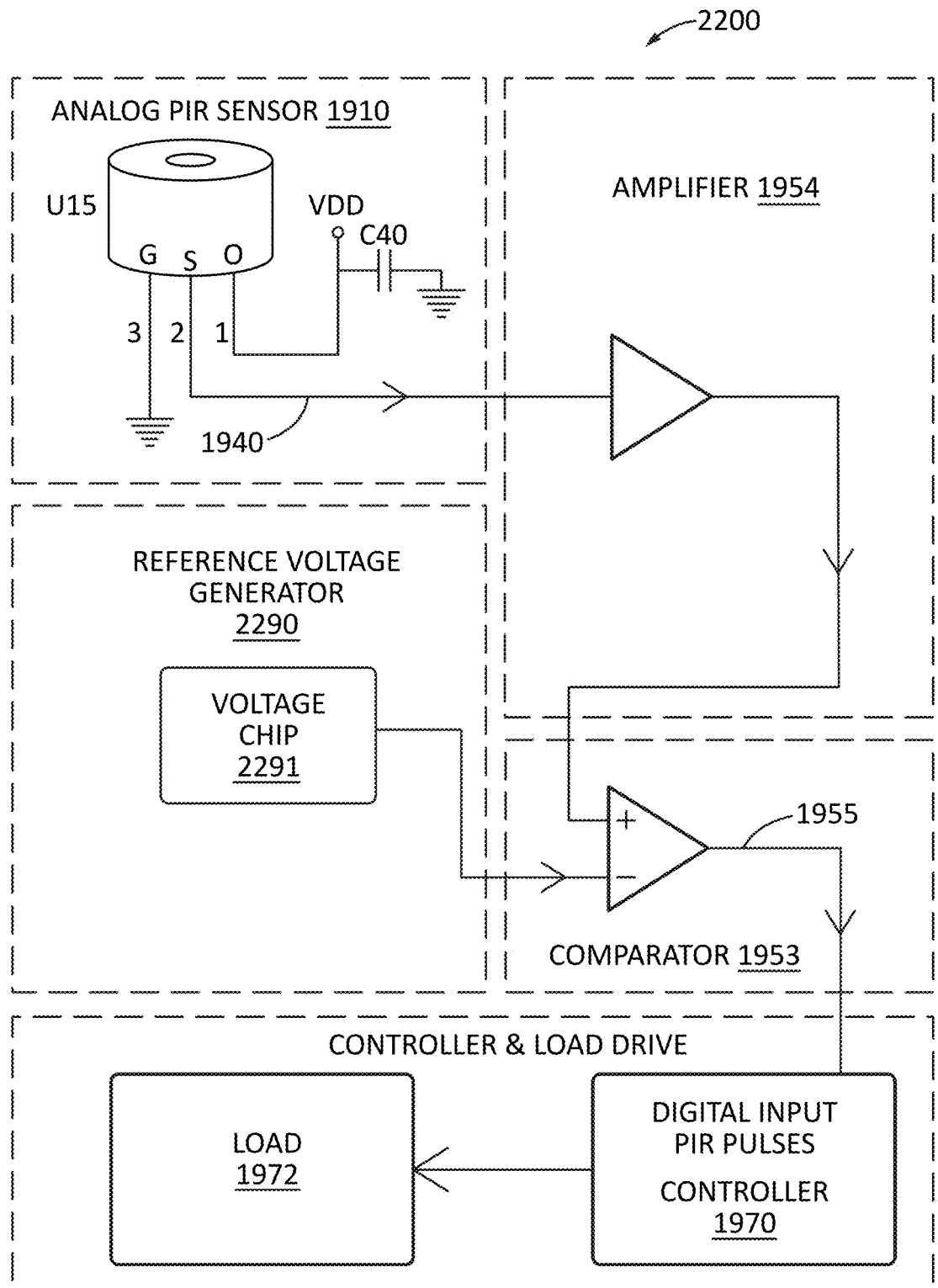
FIG. 22 is a circuit diagram of an embodiment of a motion sensing device in which a fixed voltage chip is fixed to a reference voltage generator that may set a threshold for a comparator, according to one or more embodiments of the present disclosure.

FIG. 22 is a circuit diagram of a motion sensing device 2200 in which a fixed voltage chip 2291 is fixed to a reference voltage generator 2290 that may set a threshold for a comparator 1953. As such, a different threshold may be set depending on a desired FoV, similar to the first embodiment of FIG. 19. However, in contrast to the first embodiment, the threshold is not dynamically adjustable (e.g., not adjustable based on inputs from a controller) because the threshold is set by a fixed voltage chip 2291. The voltage value of the voltage chip 2291 may be determined using a reference or lookup table that correlates a particular sensor (e.g., based on the sensor's commercial identifier) with a desired FoV for the sensor. The voltage value of the determined voltage chip 2291 is such that, when coupled to the reference voltage generator 2290, sets a threshold for the comparator 1953 that would achieve an effective FoV for the motion sensing device 2200 substantially equivalent to the desired FoV. The determined voltage chip 2291 may be a single voltage chip, or may be multiple voltage chips. A particular advantage of the fourth embodiment is that the FoV of the motion sensing device 2200 may be controlled without use of software or firmware, which may be preferred for especially simple motion sensing devices.

Figure 23:
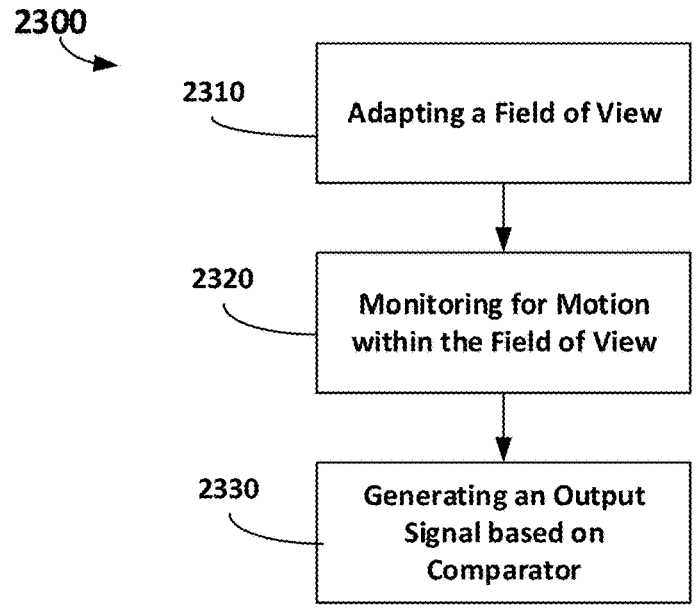
FIG. 23 is a flow chart illustrating an example method of controlling a field of view of a motion sensing device, according to one or more embodiments of the present disclosure.

FIG. 23 is a flow chart illustrating an example method 2300 of controlling a field of view of a motion sensing device. In some embodiments, the method 2300 may be performed by any of motion sensing devices 1800, 1900, 2000, 2100, or 2200.

The method 2300 may include, at block 2310, adapting a field of view of a motion sensing device about a primary sensing axis of the motion sensing device. The motion sensing device may include a passive infrared (PIR) sensor, and adapting the field of view may include controlling a detection sensitivity of the PIR sensor. Controlling the detection sensitivity may mean that some motion that would not be registered as detected motion by a motion sensing device with standard (or fixed) detection sensitivity may be registered based on the controlled sensitivity, or that some motion that would be registered as detected motion by a motion sensing device with standard (or fixed) detection sensitivity may not be registered based on the controlled sensitivity.

In a first embodiment, the sensitivity may be controlled by setting a threshold of a comparator to which the output from the PIR sensor is compared. Because motion is registered as detected motion based on the threshold, by setting a different threshold, the set of motions that are registered as detected may be changed. The threshold may be set by adjusting a resistance value of one or more programmable resistors in a digital potentiometer that is communicatively coupled the comparator, or may be set based on a signal received from an external controller. In a second embodiment, the detection sensitivity may be controlled by altering a gain or amplification applied to the output of the PIR sensor. By affecting the signal that is compared against the comparator's threshold, the set of motions that are registered as detected may similarly be changed. Altering the gain or amplification may be accomplished via the inclusion of one or more programmable resistors in the amplifier stage of existing control circuitry.

The method 2300 may further include, at block 2320, monitoring for motion within the field of view. When the PIR sensor receives infrared radiation from a heat source moving through a FoV of the PIR sensor, the PIR sensor may produce an output signal with a voltage indicative of the received radiation. This signal may be processed and filtered through one or more amplifier stages, and may be received by a comparator. As discussed above with reference to block 2310, the amplifier stage(s) may be altered by the inclusion of one or more programmable resistors.

The method 2300 may further include, at block 2330, generating an output signal, from the comparator, based on a comparison of the filtered output signal to a threshold voltage value. The output signal here may be received by and selectively acted upon by a controller. As discussed above with reference to block 2310, this process may be altered or affected to, essentially, change which output signals from the PIR sensor are acted upon by the controller (e.g., which signals are treated by the controller as detected motion). For example, the threshold voltage used in the comparison may be affected through the inclusion of one or more programmable resistors in a resistor divider network coupled to the comparator, may be set through one or more programmable resistors in the amplifier stage that alter a gain or amplification applied to the output of the PIR sensor, or may be set through the use of one or more fixed voltage chips.

Figure 24:
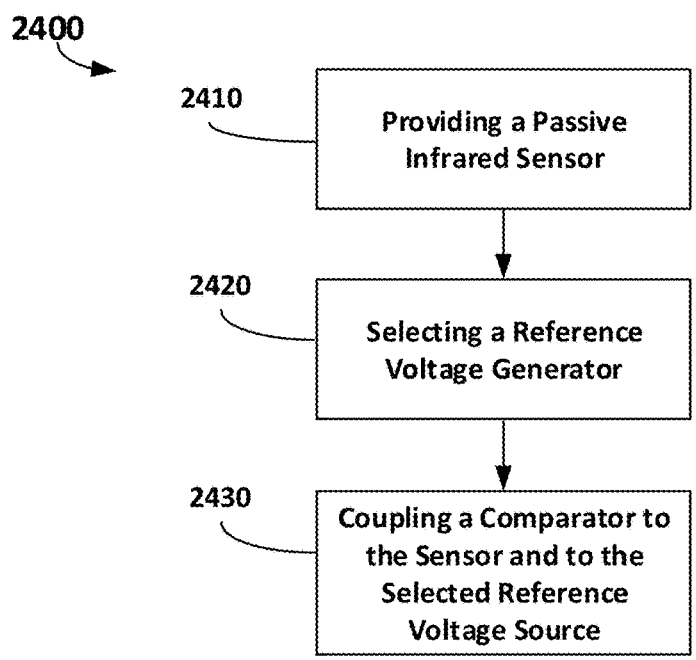
FIG. 24 is a flow chart illustrating an example method of manufacturing a motion sensing device, according to one or more embodiments of the present disclosure.

FIG. 24 is a flow chart illustrating an example method 2400 of manufacturing a motion sensing device. In some embodiments, the method 2400 may be performed in connection with any of motion sensing devices 1800, 1900, 2000, 2100, or 2200.

The method 2400 may include, at block 2410, providing a passive infrared (PIR) sensor for the motion sensing device. This PIR sensor may be an analog PIR sensor, such that an output signal from the PIR sensor is an analog signal.

The method 2400 may further include, at block 2420, selecting a reference voltage generator based on a desired voltage. The reference voltage generator may include one or more voltage chips that provide a fixed amount of voltage, and may operate as a threshold voltage source for a comparator. The desired voltage may be based on a desired FoV for the motion sensing device, as different voltage values for the threshold voltage result in different detection sensitivities (and therefore FoV) for the motion sensing device. For each model or brand of PIR sensor, a desired FoV may be associated with a voltage value, such that the desired voltage for the reference voltage generator may be determined from a lookup table or reference table that associates a model of PIR sensor with various FoV. The model of sensor may be identified using a stock-keeping unit (SKU) associated with the product.

In some alternative embodiments, the threshold voltage source may include a resistor divider network with one or more programmable resistors that may be configured to change or have variable resistance in response to input from a controller. By changing the resistance value of the programmable resistor(s), the voltage provided by the resistor divider network may be increased or decreased.

The method may further include, at block 2430, coupling the comparator to the PIR sensor and to the threshold voltage source. A first input of the comparator may be coupled to the PIR sensor to receive the output signal from the PIR sensor, and a second input of the comparator may be coupled to the threshold voltage source to receive the amount of voltage that sets the threshold value to which the output signal may be compared. Based on a comparison of the output signal to the threshold value, the comparator may be configured to output a comparison signal indicative of motion detected.

Embodiments of the present disclosure are directed to enabling electrical control over the field of view of a passive infrared sensor. Such embodiments may provide for motion sensing devices that can be deployed and adapted to a wider variety of locations and/or used in a wider variety of roles than traditional motion sensing devices having a static field of view.

Particular embodiments of the present disclosure include a method implemented in a motion sensing device. The method comprises adapting a field of view around a primary sensing axis of the motion sensing device by electrically controlling a detection sensitivity of a passive infrared sensor of the motion sensing device. The method further comprises, responsive to adapting the field of view, monitoring for motion within the field of view using the passive infrared sensor.

In some embodiments, electrically controlling the detection sensitivity may comprise setting a threshold for comparison to an electrical output of the passive infrared sensor. In some such embodiments, setting a threshold may comprise setting a resistance of a programmable resistor in a digital potentiometer that is communicatively coupled to the comparator. In some such embodiments, setting the threshold may comprise sending a digital signal indicative of a desired threshold, converting the digital signal to an analog signal, and inputting the analog signal to a comparator for comparison with the output of the passive infrared sensor.

In some embodiments, electrically controlling the detection sensitivity may comprise altering a gain of a circuit portion coupled to an output of the passive infrared sensor. In some such embodiments, altering the gain of the circuit portion may comprise setting a resistance of a programmable resistor within the circuit portion.

In some embodiments, the method may further comprise detecting motion within the field of view and generating an output signal indicating that the motion is detected. In some such embodiments, the output signal may be an analog signal. Other embodiments of the present disclosure include a motion sensing device. The motion sensing device may comprise a passive infrared sensor, and control circuitry communicatively coupled to the passive infrared sensor. The control circuitry is configured to adapt a field of view around a primary sensing axis of the motion sensing device by electrically controlling a detection sensitivity of the passive infrared sensor. The control circuitry may be further configured to, responsive to adapting the field of view, monitor for motion within the field of view using the passive infrared sensor. In some embodiments, the passive infrared sensor may be an analog sensor, and an output of the passive infrared sensor may be an analog signal.

In some embodiments, the control circuitry further may comprise a programmable resistor and a controller communicatively coupled to the programmable resistor.

In some such embodiments, the control circuitry may further comprise a comparator coupled to an output of the passive infrared sensor, and an output of the comparator may be indicative of motion within the field of view. The programmable resistor may be electrically coupled with the comparator to set a comparison threshold of the comparator. In some such embodiments, the programmable resistor may be in a resistor network electrically coupled to the comparator.

In some such embodiments, the control circuitry may further comprise an amplifier circuit portion configured to receive an output of the passive infrared sensor. A resistance of the programmable resistor may set a gain of the amplifier circuit portion. In some such embodiments, the amplifier circuit portion may comprise a first amplifier stage and a second amplifier stage. The programmable resistor may comprise two programmable resistors, and each of the first amplifier stage and the second amplifier stage may comprise one of these programmable resistors.

In some embodiments, the control circuitry may further comprise a controller, a comparator coupled to an output of the passive infrared sensor, and a digital-to-analog convertor. The convertor may be configured to receive, from the controller, a signal indicative of a desired threshold for the comparator and to output, to the comparator, a converted signal based on the received signal. An output of the comparator may be indicative of motion within the field of view.

In some embodiments, the control circuitry may further comprise a digital potentiometer electrically coupled to the controller. One or more programmable resistors may be located in the digital potentiometer.

Other embodiments of the present disclosure include a method of manufacturing a motion sensing device. In particular, the method may comprise providing a passive infrared sensor, and electrically coupling a first input of a comparator to an output of the passive infrared sensor and a second input of the comparator to a threshold voltage source. An output of the comparator may be indicative of motion within a field of view of the passive infrared sensor.

In some embodiments, the threshold voltage source may comprise a circuit portion comprising a programmable resistor and a controller electrically coupled to the programmable resistor to set the resistance of the programmable resistor.

In some embodiments, the method may further comprise selecting a reference voltage generator of a desired voltage from among a plurality of reference voltage generators of different voltages. The threshold voltage source may comprise the reference voltage generator.

Of course, those skilled in the art will appreciate that the present embodiments are not limited to the above contexts or examples, and will recognize additional features and advantages upon reading the following detailed description and upon viewing the accompanying drawings.

Aspects of the present disclosure may, of course, be carried out in other ways than those specifically set forth herein without departing from the spirit and scope of the disclosure. The present embodiments are to be considered in all respects as illustrative and not restrictive, and all changes that are within the meaning, or equivalent to, that which is recited in the appended claims are intended to be embraced therein. Although steps of various processes or methods described herein may be shown and described as being in a particular sequence or temporal order, the steps of any such processes or methods are not limited to being carried out in any particular sequence or order, absent an indication otherwise. Indeed, the steps in such processes or methods generally may be carried out in various different sequences and orders while still falling within the spirit and scope of the present disclosure.

What is claimed is:

1. A method, implemented in a motion sensing device, the method comprising:
adapting a field of view around a primary sensing axis of the motion sensing device by electrically controlling a detection sensitivity of a passive infrared sensor of the motion sensing device; and
responsive to adapting the field of view, monitoring for motion within the field of view using the passive infrared sensor, wherein electrically controlling the detection sensitivity comprises setting a threshold for comparison by a comparator to an electrical output of the passive infrared sensor.

2. The method of claim 1, wherein setting the threshold comprises setting a resistance of a programmable resistor in a digital potentiometer communicatively coupled to the comparator.

3. The method of claim 1, wherein setting the threshold comprises:
sending a digital signal indicative of a desired threshold;
converting the digital signal to an analog signal; and
inputting the analog signal to a comparator for comparison with the output of the passive infrared sensor.

4. The method of claim 1, further comprising detecting motion within the field of view and generating an output signal indicating that the motion is detected.

5. The method of claim 4, wherein the output signal is an analog signal.

6. A motion sensing device comprising:
a passive infrared sensor; and
control circuitry communicatively coupled to the passive infrared sensor and configured to
adapt a field of view around a primary sensing axis of the motion sensing device by electrically controlling a detection sensitivity of the passive infrared sensor; and
responsive to adapting the field of view, monitor for motion within the field of view using the passive infrared sensor, wherein the control circuitry comprises a programmable resistor and a controller communicatively coupled to the programmable resistor.

7. The motion sensing device of claim 6, wherein the control circuitry further comprises a comparator coupled to an output of the passive infrared sensor, wherein an output of the comparator is indicative of motion within the field of view,
wherein the programmable resistor is electrically coupled with the comparator to set a comparison threshold of the comparator.

8. The motion sensing device of claim 7, wherein the programmable resistor is in a resistor divider network electrically coupled to the comparator.

9. The motion sensing device of claim 6, wherein the control circuitry further comprises an amplifier circuit portion configured to receive an output of the passive infrared sensor, wherein a resistance of the programmable resistor sets a gain of the amplifier circuit portion.

10. The motion sensing device of claim 9, wherein:
the amplifier circuit portion comprises a first amplifier stage and a second amplifier stage;
the programmable resistor comprises two programmable resistors; and
each of the first amplifier stage and the second amplifier stage comprises one of the programmable resistors.

11. The motion sensing device of claim 6, wherein the control circuitry further comprises a digital potentiometer electrically coupled to the controller,
wherein the programmable resistor is located in the digital potentiometer.

12. The motion sensing device of claim 6, wherein the passive infrared sensor is an analog sensor, and wherein an output of the passive infrared sensor is an analog signal.

13. A method of manufacturing a motion sensing device, comprising:
providing a passive infrared sensor; and
electrically coupling a first input of a comparator to an output of the passive infrared sensor and a second input of the comparator to a threshold voltage source, wherein an output of the comparator is indicative of motion within a field of view of the passive infrared sensor.

14. The method of claim 13, wherein the threshold voltage source comprises a circuit portion comprising a programmable resistor and a controller electrically coupled to the programmable resistor to set a resistance of the programmable resistor.

15. The method of claim 13, further comprising:
selecting a reference voltage generator of a desired voltage from among a plurality of reference voltage generators of different voltages,
wherein the threshold voltage source comprises the reference voltage generator.

16. A method, implemented in a motion sensing device, the method comprising:
adapting a field of view around a primary sensing axis of the motion sensing device by electrically controlling a detection sensitivity of a passive infrared sensor of the motion sensing device; and
responsive to adapting the field of view, monitoring for motion within the field of view using the passive infrared sensor, wherein electrically controlling the detection sensitivity comprises altering a gain of a circuit portion coupled to an output of the passive infrared sensor.

17. The method of claim 16, wherein altering the gain of the circuit portion comprises setting a resistance of a programmable resistor within the circuit portion.

18. A motion sensing device comprising:
a passive infrared sensor; and
control circuitry communicatively coupled to the passive infrared sensor and configured to:
adapt a field of view around a primary sensing axis of the motion sensing device by electrically controlling a detection sensitivity of the passive infrared sensor; and
responsive to adapting the field of view, monitor for motion within the field of view using the passive infrared sensor, wherein the control circuitry comprises a controller, a comparator coupled to an output of the passive infrared sensor, wherein an output of the comparator is indicative of motion within the field of view, and a digital-to-analog converter configured to receive, from the controller, a signal indicative of a desired threshold for the comparator and to output, to the comparator, a converted signal based on the received signal.

* * * * *